(12) United States Patent
Kim et al.

(10) Patent No.: US 8,050,247 B2
(45) Date of Patent: Nov. 1, 2011

(54) METHOD AND APPARATUS FOR RETRANSMITTING PACKET IN A MOBILE COMMUNICATION SYSTEM, AND SYSTEM THEREOF

(75) Inventors: Soeng-Hun Kim, Suwon-si (KR); Sung-Ho Choi, Suwon-si (KR); Gert Jan Van Lieshout, Staines (GB); Himke Van Dervelde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 11/529,736

(22) Filed: Sep. 29, 2006

(65) Prior Publication Data

US 2007/0086422 A1    Apr. 19, 2007

(30) Foreign Application Priority Data

Sep. 29, 2005  (KR) .................. 10-2005-0091333
Jan. 27, 2006  (KR) .................. 10-2006-0009041
Jul. 5, 2006   (KR) .................. 10-2006-0063110

(51) Int. Cl.
  *H04J 3/24*     (2006.01)
  *H04L 1/18*     (2006.01)

(52) U.S. Cl. ................. 370/349; 370/469; 714/748

(58) Field of Classification Search ............ 370/349, 370/469

See application file for complete search history.

(56) References Cited

U.S. PATENT DOCUMENTS

| | | | |
|---|---|---|---|
| 2002/0001296 A1 | 1/2002 | Lee et al. | |
| 2003/0007480 A1* | 1/2003 | Kim et al. | 370/349 |
| 2003/0039270 A1* | 2/2003 | Chang et al. | 370/469 |
| 2004/0170192 A1 | 9/2004 | Herrmann | |
| 2005/0022098 A1 | 1/2005 | Vayanos et al. | |
| 2006/0018259 A1* | 1/2006 | Kadous | 370/236 |
| 2008/0081651 A1* | 4/2008 | Kuroda et al. | 455/509 |

FOREIGN PATENT DOCUMENTS

EP    1 557 967        7/2005
KR    1020030050124    6/2003

OTHER PUBLICATIONS

Fontenelle S et al., "Blind recognition of retransmitted packets for HARQ system", Wireless Communications and Networking, 2003, vol. 2, Mar. 16, 2003, pp. 838-842, USA.

* cited by examiner

*Primary Examiner* — Pierre-Louis Desir
*Assistant Examiner* — Joshua Schwartz
(74) *Attorney, Agent, or Firm* — Roylance, Abrams, Berdo & Goodman, LLP

(57) ABSTRACT

A retransmission method and apparatus performed in a transmitter of a mobile communication system supporting a Hybrid Automatic Retransmission reQuest (HARQ) operation and an Automatic Retransmission request (ARQ) operation for retransmission of a packet are provided. At least one ARQ entity generates at least one ARQ packet, and an HARQ entity transmits an HARQ packet including the at least one ARQ packet to a receiver, and transmits a local NACK signal indicating transmission fail of the ARQ packet to a corresponding ARQ entity, if the HARQ packet fails in transmission.

60 Claims, 14 Drawing Sheets

| Processor ID | Timestamp | ARQ packet id (ARQ entity id, Sequence Number) | Transmission Status | NACK/ACK error | Timer |
|---|---|---|---|---|---|
| 0 | 1000 | (0,10), (1,123), (3,34) | Fail | | |
| 1 | 1002 | (0,11), (2,74), (3,35) | Success | No | Expire |
| 2 | 1005 | (0,12), (1,124) | Success | Yes | running |
| 3 | 1010 | (1,125), (2,75), (3,36) | Success | No | running |
| ... | ... | ... | ... | ... | ... |

FIG.6

METHOD AND APPARATUS FOR RETRANSMITTING PACKET IN A MOBILE COMMUNICATION SYSTEM, AND SYSTEM THEREOF

CROSS-REFERENCE TO RELATED PATENT APPLICATION

This application claims the benefit under 35 U.S.C. §119(a) of Korean Patent Applications filed in the Korean Intellectual Property Office on Sep. 29, 2005 and assigned Serial No. 2005-91333, filed in the Korean Intellectual Property Office on Jan. 27, 2006 and assigned Serial No. 2006-9041, and filed in the Korean Intellectual Property Office on Jul. 5, 2006 and assigned Serial No. 2006-63110, the entire disclosures of which are hereby incorporated by reference.

BACKGROUND OF THE INVENTION

1. Field of the Invention

The present invention relates generally to a Hybrid Automatic Retransmission reQuest (HARQ) method and apparatus in a mobile communication system. More particularly, the present invention relates to a method and apparatus for efficiently performing an Automatic Retransmission reQuest (ARQ) operation in an upper layer using a transmission status of an HARQ apparatus in a mobile communication system.

2. Description of the Related Art

The Third Generation Partnership Project (3GPP) is a standard group in charge of standardization of the Universal Mobile Telecommunication Service (UMTS) system. Long Term Evolution (LTE) is currently under discussion as the standard for the next generation mobile communication system. The LTE which is aimed at deployment in 2010 is a technology capable of implementing high speed packet-based communication at about 100 Mbps. Several schemes are also currently under discussion. For example, the schemes include one scheme for reducing the number of nodes located in a communication path by simplifying a configuration of the network, and another scheme for approximating radio protocols as close to a radio channel as possible. A configuration of the LTE is expected to change from the existing 4-node configuration to a 2-node or 3-node configuration. For example, a configuration of the LTE, as illustrated in FIG. 1, will be simplified to the 2-node configuration of an Evolved Node B (ENB) and an Evolved Gateway GPRS Serving Node (EGGSN).

FIG. 1 is a block diagram illustrating an exemplary configuration of a general LTE mobile communication system as an evolved mobile communication system. As illustrated, Evolved Radio Access Networks (E-RANs) 110 and 112 are simplified to a 2-node configuration of Evolved Node Bs (ENBs) 120, 122, 124, 126 and 128, and Evolved Gateway GPRS Serving Node (EGGSNs) 130 and 132. A User Equipment (UE) 101 accesses an Internet Protocol (IP) network 114 via the E-RANs 110 and 112.

In FIG. 1, the ENBs 120, 122, 124, 126 and 128, which are network entities corresponding to the legacy Node Bs, are connected to the UE 101 via radio channels. Compared with the legacy Node Bs, the ENBs 120, 122, 124, 126 and 128 perform complex functions. In LTE, all user traffic including real-time traffic such as Voice over IP (VoIP) service traffics will be serviced through a shared channel. Therefore, there is no need for an apparatus for collecting status information of UEs 101 and performing scheduling thereon. For example, the ENBs take charge of the scheduling.

Similar to High Speed Downlink Packet Access (HSDPA) or Enhanced Dedicated Channel (EDCH) for providing high-speed packet service, LTE also performs a Hybrid Automatic Retransmission Request (HARQ) for packet retransmission between the ENBs 120, 122, 124, 126 and 128 and the UE 101. HARQ refers to a technique for soft-combining previously received data with retransmitted data without discarding the previously received data if a reception error occurs at a receiver. This technique increases a reception success rate. The high-speed packet communication system such as HSDPA and EDCH uses the HARQ in order to increase transmission efficiency. LTE also uses the HARQ between the UE and the ENB.

In the evolved high-speed packet communication system, such as LTE, it is not possible to satisfy various Quality-of-Service (QoS) requirements only with the HARQ. Therefore, outer Automatic Retransmission Request (ARQ) can be performed in an upper layer, and the outer ARQ is also performed between the UE and the ENB. LTE will use Orthogonal Frequency Division Multiplexing (OFDM) as a radio access technology in the 20-MHz bandwidth in order to implement a data rate of a maximum of 100 Mbps. In addition, an Adaptive Modulation & Coding (AMC) scheme for determining a modulation scheme and a channel coding rate according to a channel status of the UE will be applied to LTE.

FIG. 2 illustrates an exemplary radio protocol structure and packet structure in a general LTE system. The radio protocol structure of FIG. 2 is applied to the ENB and the UE.

Referring to FIG. 2, a radio protocol of the LTE includes ARQ entities 210 for performing retransmission in upper layers, a Medium Access Control (MAC) layer 215 where an HARQ operation is performed, and a physical (PHY) layer 217. One ARQ entity 210 can be provided for each individual service, and satisfies required QoS through an outer ARQ operation. The upper layers 205 translate to protocol stacks formed for each individual service. For example, AMR codec/RTP/UDP/IP or FTP/TCP/IP can be the upper layer.

The MAC layer 215, connected to a plurality of ARQ entities 210, multiplexes at least one ARQ packet 220 and 230 to one HARQ packet 225, and performs HARQ operation on the HARQ packet 225. The physical layer 217 performs an operation of transmitting/receiving the HARQ packet 225 over a radio channel. The ARQ packets 220 and 230 and the HARQ packet 225 will be described separately. The ARQ packets 220 and 230 are the packets reconfigured so that outer ARQ can be performed on the data delivered from the upper layers 205. The HARQ packet 225 is the packet that is actually transmitted/received on a radio channel through an HARQ operation.

Structures of the ARQ packets 220 and 230 and the HARQ packet 225 will be described. The ARQ packets 220 and 230 each include a sequence number (SN) 231, Size information 233, Framing header (HDR) information 235, and a payload 237. If an IP packet is delivered from the upper layer 205 to the ARQ entity 210, the whole or a portion of the IP packet can be transmitted according to radio channel status or scheduling status. Reconfiguring the original packet delivered in an appropriate size from the upper layer 205 is called 'framing', and the framing HDR information 235 is the information with which a receiver can restore the framed packet to its original packet. In addition, the Size information 233 indicates a size of the ARQ packets 220 and 230, and the SN 231 is sequentially assigned to the ARQ packets 220 and 230. The ARQ entity 210 performs an outer ARQ using the SN. The HARQ packet 225 includes a Multiplexing header (HDR) 240, and a payload. The Multiplexing HDR 240 includes multiplexing information for at least one ARQ packet 220 or ARQ packet 230. For example, an identifier (ID) of the ARQ entity 210 can be the Multiplexing HDR 240.

FIG. 3 is a diagram illustrating an ARQ operation and an HARQ in a general LTE system. In the following description, it will be construed that the ARQ operation is equal to an outer ARQ operation.

As illustrated in FIG. 3, an HARQ entity is divided into a transmitter's HARQ entity 372 and a receiver's HARQ entity 312 according to transmission/reception operation. The transmitter's HARQ entity 372 takes charge of transmission/retransmission of an HARQ packet, and the receiver's HARQ entity 312 takes charge of soft-combining on an HARQ packet and acknowledgement/negative acknowledgement (ACK/NACK) signal transmission. Because a UE and an ENB each have a transmitter and a receiver, the transmitter and the receiver are not limited herein to any one of the UE and the ENB. The UE and the ENB may also correspond to a mobile station (MS) and a base station (BS), respectively.

Because services of various types should be provided through the HARQ, the transmitter and the receiver include their own upper layer entities (not shown), ARQ entities 380 and 305, and multiplexing/demultiplexing blocks 375 and 310, respectively. The multiplexing block 375 in the transmitter inserts the Multiplexing HDR 240 in the data generated by several upper layers, and delivers the resulting data to the transmitter's HARQ entity 372, and the demultiplexing block 310 in the receiver delivers the multiplexing information of data provided from the receiver's HARQ entity 312 to a proper upper layer.

A plurality of HARQ processors 355 to 370 and 315 to 330 included in the transmitter's HARQ entity 372 and the receiver's HARQ entity 312 are basic units for taking charge of transmission/reception of the HARQ packet 225. The transmitter's HARQ processors 355, 360, 365 and 370 take charge of transmission/retransmission of the HARQ packet 225, and the receiver's HARQ processors 315, 320, 325 and 330 take charge of reception and soft-combining of an HARQ packet, and ACK/NACK information transmission. The HARQ processors are provided in the transmitter and the receiver in pairs, and continuous transmission/reception is possible by providing a plurality of HARQ processors in one HARQ entity.

In the transmitter, each of the HARQ processors includes operations of transmitting a user packet, receiving ACK/NACK information in response thereto, and performing retransmission. Therefore, if there is only one HARQ processor, the HARQ processor cannot transmit other packets until it transmits user data and receives ACK/NACK information in response thereto. However, in the case where several HARQ processors are provided in the transmitter and the receiver, while one processor waits for the ACK/NACK information, the other processors can transmit data. Therefore, continuous transmission/reception is possible by providing a plurality of HARQ processors in each HARQ entity as shown in FIG. 3.

A description will now be made of basic operations of the HARQ processors 355 to 370 and 315 to 330.

The transmitter's HARQ processors 355, 360, 365 and 370 perform channel coding on the data received from the multiplexing block 375 and transmit the channel-coded data to the receiver. Also, the transmitter's HARQ processors 355, 360, 365 and 370 simultaneously store the channel-coded data in a buffer (not shown) to retransmit it later. Further, the transmitter's HARQ processors 355, 360, 365 and 370 flush the data stored in the buffer upon receipt of HARQ ACK information for the transmitted data from the receiver, and retransmit the data stored in the buffer upon receipt of NACK information for the transmitted data from the receiver.

The receiver's HARQ processors 315, 320, 325 and 330 perform channel decoding on the data received from the transmitter over a physical channel, and determine whether there is an error through a CRC operation. If there is an error, the receiver's HARQ processors 315, 320, 325 and 330 store the received data in a buffer, and transmit an HARQ NACK signal to the transmitter. If retransmitted data for the received data is received due to the error, the receiver's HARQ processors 315, 320, 325 and 330 soft-combine the data stored in the buffer with the retransmitted data, and then determine whether there is an error. If an error is determined to still exist, the receiver's HARQ processors 315, 320, 325 and 330 transmit an HARQ NACK signal to the transmitter, and repeat the above process. If it is determined that the error is solved, the receiver's HARQ processors 315, 320, 325 and 330 transmit an HARQ ACK signal to the transmitter, and deliver user data to the demultiplexing block 310.

The reception success rate can increase through the HARQ operation of retransmitting and soft-combining the defective HARQ packet. However, it is inefficient to achieve a very low Block Error Rate (BLER) only with the HARQ operation, for the following two reasons.

First, if there is an error in an HARQ ACK/NACK signal, the HARQ operation cannot detect the error.

Second, because HARQ transmission/retransmission is performed within a relatively short time, the HARQ operation cannot obtain a time diversity gain. As a simple example, if an MS falls in deep fading, it is hard to successfully transmit the HARQ packet through HARQ retransmission.

In order to overcome the limitation of the HARQ operation, there is a need to perform the outer ARQ operation.

The outer ARQ operation is performed in units of ARQ packets. The transmitter's ARQ entity 380 attaches SNs 231 to the ARQ packets 220 and 230 shown in FIG. 2 before transmission. The receiver's ARQ entity 305 verifies the SNs 231 of the received ARQ packets 220 and 230, and determines whether there is any missing ARQ packet. For example, if the receiver's ARQ entity 305 has received an ARQ packet with SN=X and an ARQ packet with SN=X+2, but has failed to receive an ARQ packet with SN=X+1, the receiver's ARQ entity 305 sends a retransmission request for the ARQ packet with SN=X+1 to the transmitter's ARQ entity 380.

FIG. 4 is a block diagram illustrating a detailed structure of the ARQ entities 305 and 380 for performing an outer ARQ operation in a general LTE system. Herein, the outer ARQ operation is performed by the transmitter's ARQ entity 380 and the receiver's ARQ entity 305.

The transmitter's ARQ entity 380 includes a transmission buffer 405, a header inserter 410, an ARQ control block 415, and a retransmission buffer 420. The transmission buffer 405 stores the packets delivered from an upper layer. The transmission buffer 405 also delivers as much of the upper layer packet as the amount of data to be transmitted in the next transmission period, to the header inserter 410. If the amount of data to be transmitted in the next transmission period is not equal to a size of the upper layer packet, the transmission buffer 405 may only deliver a part of the upper layer packet by segmenting the upper layer packet, or may deliver a plurality of upper layer packets.

The header inserter 410 inserts SN information 231, Size information 233 and Framing HDR information 235 illustrated in FIG. 2 in the upper layer packet provided from the transmission buffer 405, thereby generating ARQ packets 220 and 230. The ARQ packets 220 and 230 are delivered to the retransmission buffer 420 and a lower layer (MAC/HARQ/PHY layer) 425. The retransmission buffer 420 stores ARQ packets for which the transmitter has failed to receive an ACK signal from the receiver. The ARQ control block 415 discards a corresponding ARQ packet upon receipt of an ARQ ACK signal from the receiver, and schedules retransmission of the corresponding ARQ packet upon receipt of an ARQ NACK signal. The lower layer 425 includes a MAC layer, an HARQ entity, and a PHY layer. The lower layer 425 also multiplexes ARQ packets to an HARQ packet and then transmits the HARQ packet to the receiver over a physical channel.

The receiver's ARQ entity 305 includes a reassembly block 445, a reception buffer 435, and a retransmission management block 440. A lower layer (MAC/HARQ/PHY layer) 430 receives an HARQ packet transmitted from the transmitter over a physical channel, and delivers demultiplexed ARQ packets to the receiver's ARQ entity 305.

The reception buffer 435 stores the ARQ packet received from the lower layer 430 according to its SN, and delivers ARQ packets capable of being reassembled to the reassembly block 445. The retransmission management block 440 verifies SNs of the ARQ packets stored in the reception buffer 435. The retransmission management block 440 also delivers ARQ ACK signals for the received ARQ packets and ARQ NACK signals for the missing ARQ packets to the transmitter's ARQ entity 380. The reassembly block 445 reassembles the original upper layer packet using the ARQ packets depending on the framing headers of the ARQ packets delivered from the reception buffer 435, and then delivers the upper layer packet to an upper layer.

As described above, the HARQ and outer ARQ operations retransmit the missing packets, and they are fundamentally equal to each other. However, in the mobile communication system supporting the outer ARQ, there is no solution to errors that may occur when the transmitter wrongly receives an ARQ ACK/NACK signal, or a feedback signal, from the receiver's ARQ entity 305. Therefore, the mobile communication system, similar to the LTE system using both the HARQ and ARQ, requires a technology to determine whether there is an error in an ARQ ACK/NACK signal.

Accordingly, there is a need for an improved system and method for determining whether there is an error in an ARQ ACK/NACK signal.

SUMMARY OF THE INVENTION

An aspect of exemplary embodiments of the preset invention is to address at least the above problems and/or disadvantages and to provide at least the advantages described below. Accordingly, an aspect of exemplary embodiments of the present invention is to provide a method and apparatus for determining whether there is an ARQ operation error in a mobile communication system supporting HARQ and ARQ operations, and a system thereof.

An exemplary embodiment of the present invention provides a method and apparatus for improving the performance of an ARQ operation by associating the ARQ operation with an HARQ operation in a mobile communication system supporting HARQ and ARQ operations, and a system thereof.

According to one aspect of an exemplary embodiment of the present invention, there is provided a retransmission method performed in a transmitter of a mobile communication system supporting a Hybrid Automatic Retransmission reQuest (HARQ) operation and an Automatic Retransmission request (ARQ) operation for retransmission of a packet. An HARQ packet is transmitted by an HARQ entity to a receiver. The HARQ packet comprises at least one ARQ packet. A local NACK signal is transmitted by the HARQ entity to a corresponding ARQ entity. The local NACK signal indicates whether a transmission fails of the ARQ packet. if the HARQ packet fails in transmission. Wherein the HARQ entity writes an identifier of a corresponding ARQ entity where the ARQ packet is generated and a sequence number of the corresponding ARQ packet, as table information, during transmission of the HARQ packet.

The ARQ entity starts a timer to count a predetermined time and prepare for retransmission of the ARQ packet upon receipt of the local NACK signal. An ARQ NACK signal received from an ARQ entity of the receiver for the predetermined time is disregarded.

The ARQ entity prepares for retransmission of the ARQ packet upon receipt of the local NACK signal, and disregards an ARQ NACK signal received from an ARQ entity of the receiver.

The ARQ entity prepares for retransmission of the ARQ packet upon receipt of the local NACK signal. The retransmitted ARQ packet is delivered to a lower layer and a timer for counting a predetermined time is started upon receipt of a notification indicating completed retransmission of the ARQ packet from the lower layer.

According to another aspect of an exemplary embodiment of the present invention, there is provided a retransmission method performed in a receiver of a mobile communication system to support a Hybrid Automatic Retransmission reQuest (HARQ) operation and an Automatic Retransmission request (ARQ) operation for retransmission of a packet. An HARQ packet is received by an HARQ entity. The HARQ packet comprises at least one ARQ packet from a transmitter, determines whether there is a reception error of the HARQ packet and transmits an error indicator to indicate the occurrence of the NACK/ACK error to the transmitter if the reception error of the HARQ packet is caused by a NACK/ACK error.

According to further another aspect of an exemplary embodiment of the present invention, there is provided a retransmission method performed in a mobile communication system supporting a Hybrid Automatic Retransmission reQuest (HARQ) operation and an Automatic Retransmission request (ARQ) operation for retransmission of a packet. An HARQ packet is transmitted by a transmitter's HARQ entity to a receiver. The HARQ packet includes at least one ARQ packet. The HARQ packet is received by a receiver's HARQ entity and a determination is made as to whether there is a reception error in the HARQ packet. The receiver's HARQ entity transmits a predetermined error indicator to a transmitter if the reception error of the HARQ packet is caused by a NACK/ACK error. The transmitter's HARQ entity also transmits a local NACK signal to indicate a transmission fail of a corresponding ARQ packet to a transmitter's ARQ entity upon receipt of the error indicator.

According to yet another aspect of an exemplary embodiment of the present invention, there is provided a retransmission apparatus included in a transmitter of a mobile communication system supporting a Hybrid Automatic Retransmission reQuest (HARQ) operation and an Automatic Retransmission request (ARQ) operation for retransmission of a packet. The apparatus comprises at least one ARQ entity, and an HARQ entity. The ARQ entity generates at least one ARQ packet. The HARQ entity transmits an HARQ packet including the at least one ARQ packet to a receiver, and transmits a local NACK signal indicating transmission fail of the ARQ packet to a corresponding ARQ entity, if the HARQ packet fails in transmission. Wherein the HARQ entity writes an identifier of a corresponding ARQ entity where the ARQ packet is generated and a sequence number of the corresponding ARQ packet, as table information, during transmission of the HARQ packet.

According to still another aspect of an exemplary embodiment of the present invention, there is provided a retransmission apparatus included in a receiver of a mobile communication system to support a Hybrid Automatic Retransmission reQuest (HARQ) operation and an Automatic Retransmission request (ARQ) operation for retransmission of a packet. The apparatus includes an HARQ entity. The HARQ entity receives an HARQ packet that includes at least one ARQ packet from a transmitter, determines whether there is a reception error of the HARQ packet, and if the reception error of the HARQ packet is caused by a NACK/ACK error, transmits an error indicator indicating occurrence of the NACK/ACK error to the transmitter.

According to still another aspect of an exemplary embodiment of the present invention, there is provided a retransmission system supporting a Hybrid Automatic Retransmission reQuest (HARQ) operation and an Automatic Retransmission request (ARQ) operation for retransmission of a packet. The system includes a transmitter and a receiver. The transmitter includes a transmitter's HARQ entity to transmit an HARQ packet including at least one ARQ packet to a receiver, and if a NACK/ACK error of the HARQ packet occurs, receives an error indicator transmitted from the receiver and then transmits a local NACK signal indicating transmission fail of a corresponding ARQ packet to a transmitter's ARQ entity. The receiver includes a receiver's HARQ entity to receive the HARQ packet from the transmitter and to determine whether there is a reception error in the received HARQ packet, and transmits the error indicator to the transmitter if the reception error of the HARQ packet is caused by a NACK/ACK error.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description when taken in conjunction with the accompanying drawings, in which:

FIG. 6 is a diagram illustrating an exemplary format of an HARQ transmission status table included in a transmitter's HARQ entity according to an exemplary embodiment of the present invention;

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The basic concept of an exemplary embodiment of the present invention will first be described. In the mobile communication system that performs packet retransmission using an HARQ operation and an ARQ operation according to an exemplary embodiment of the present invention, a transmitter's HARQ entity delivers a local ACK/NACK indicating the presence/absence of an error of an ARQ packet to a transmitter's ARQ entity, thereby securing a fast and smooth operation of the transmitter's ARQ entity.

ARQ ACK/NACK information generated based on presence/absence of a transmission error of an ARQ packet in an ARQ entity operating in an upper layer of an HARQ entity, includes the information indicating transmission/non-transmission of an ARQ packet. According to an exemplary implementation, a transmitter's HARQ entity is the apparatus that first recognizes the transmission/non-transmission of the ARQ packet. In a scenario where an ARQ packet with SN=x is transmitted through an HARQ entity, the transmitter's HARQ entity can succeed or fail in transmission of the ARQ packet through the HARQ operation, and it recognizes the success/failure through HARQ ACK/NACK information. For example, when transmission of the ARQ packet fails, because the ARQ packet is not delivered to the receiver's HARQ entity and ARQ entity, the receiver's HARQ entity and ARQ entity cannot recognize the fact that they failed to receive an ARQ packet with SN=x. The receiver's ARQ entity recognizes the failure to receive the ARQ packet with SN=x at the time when it receives an ARQ packet with SN=(x+1).

Therefore, the method in which the transmitter's HARQ entity sends a retransmission request to the transmitter's ARQ entity is more efficient than the method in which the receiver's ARQ entity issues a retransmission request by transmitting an ARQ NACK.

Figure 1:
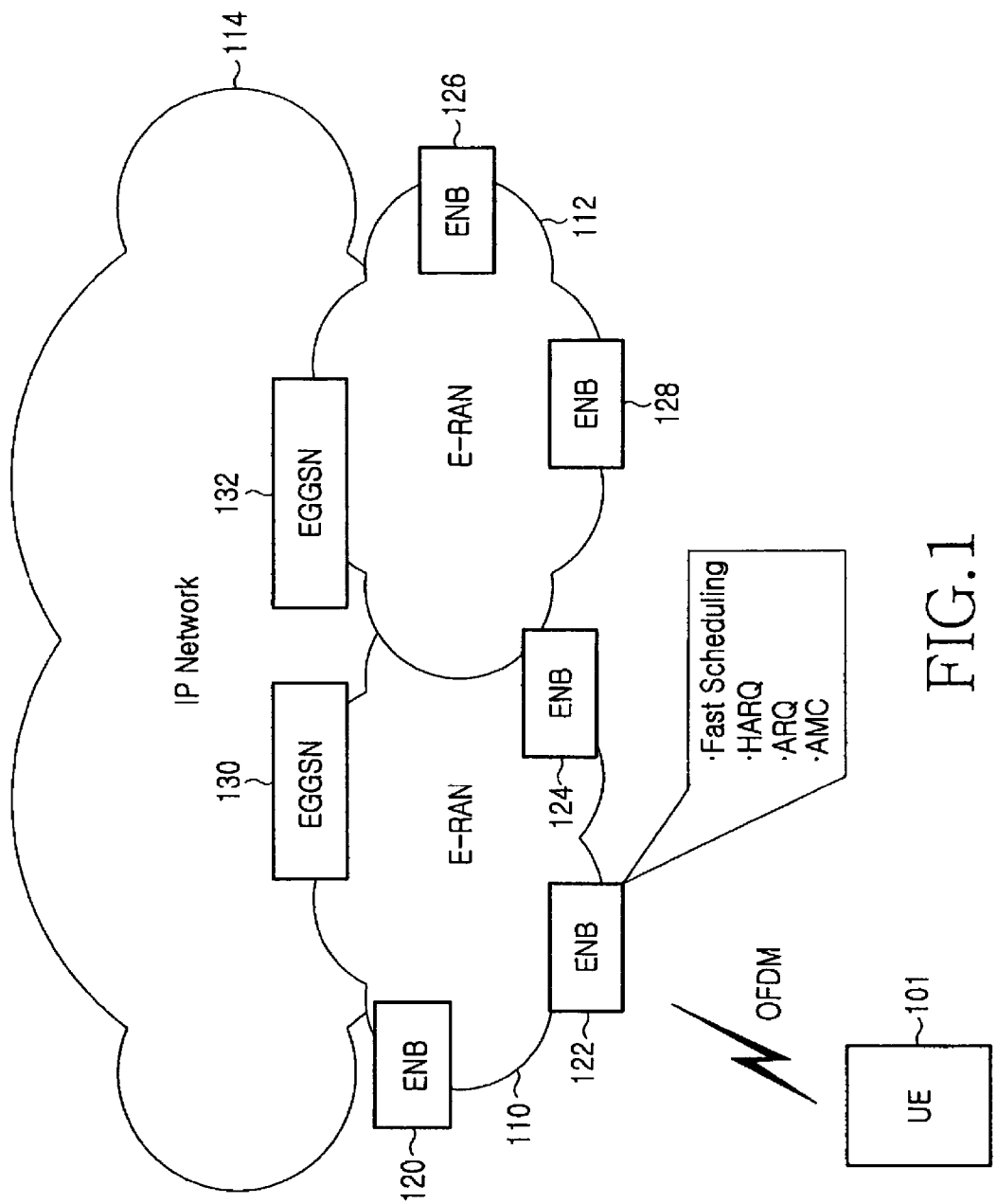
FIG. 1 is a block diagram illustrating an exemplary configuration of a general LTE system.
Figure 2:
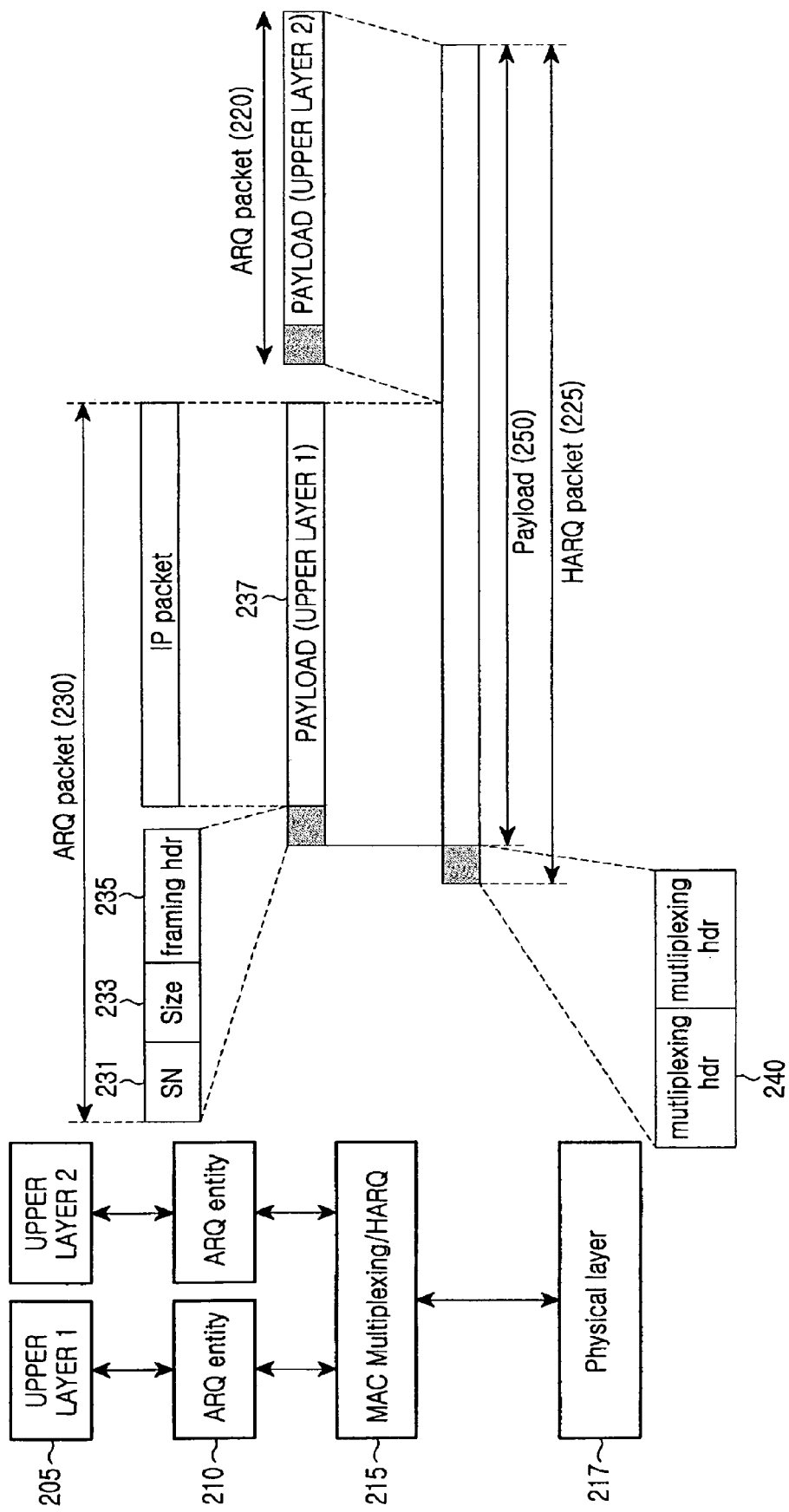
FIG. 2 is a diagram illustrating exemplary radio protocol structure and packet structure in a general LTE system.
Figure 3:
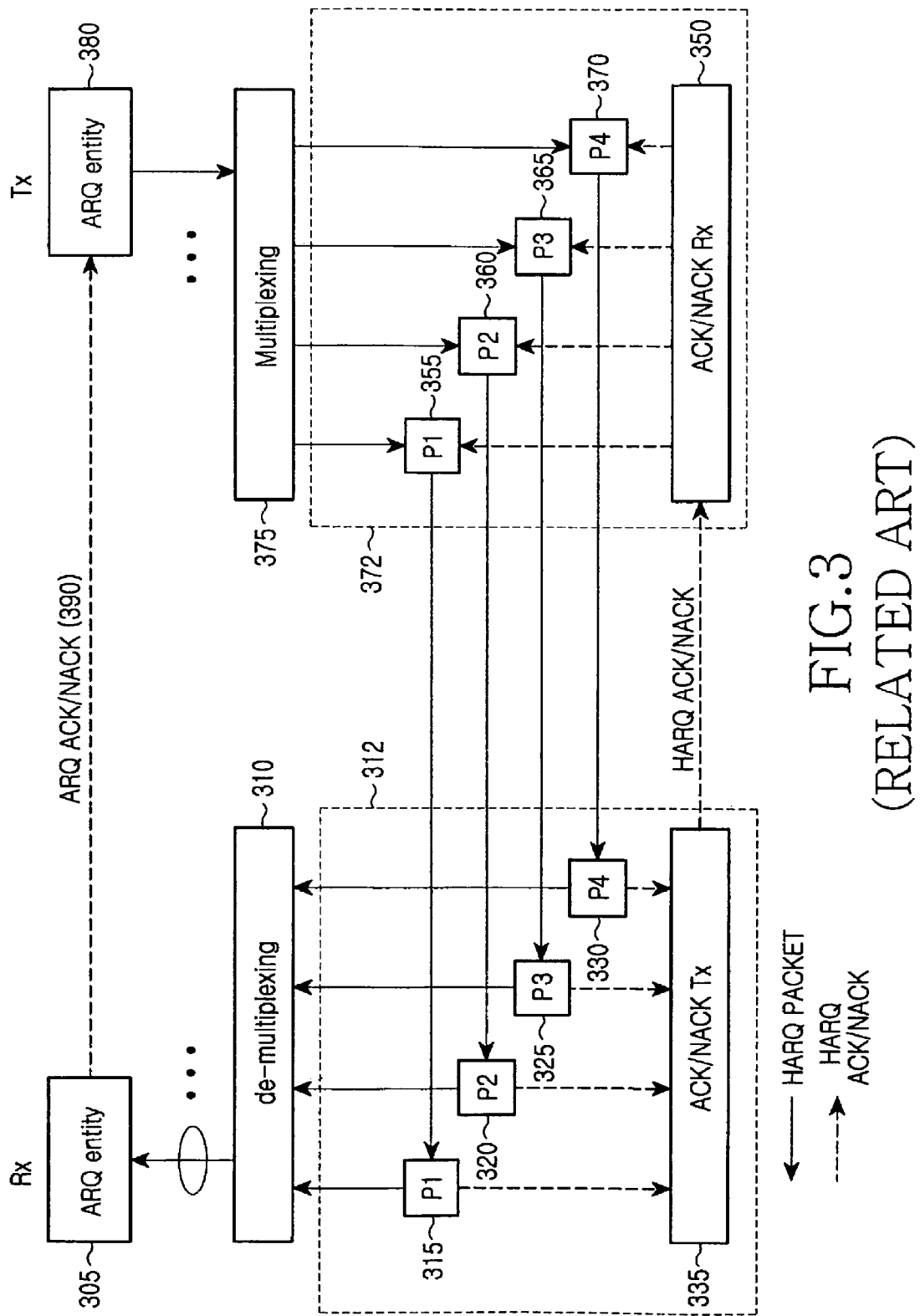
FIG. 3 is a diagram illustrating an ARQ operation and an HARQ in a general LTE system.
Figure 4:
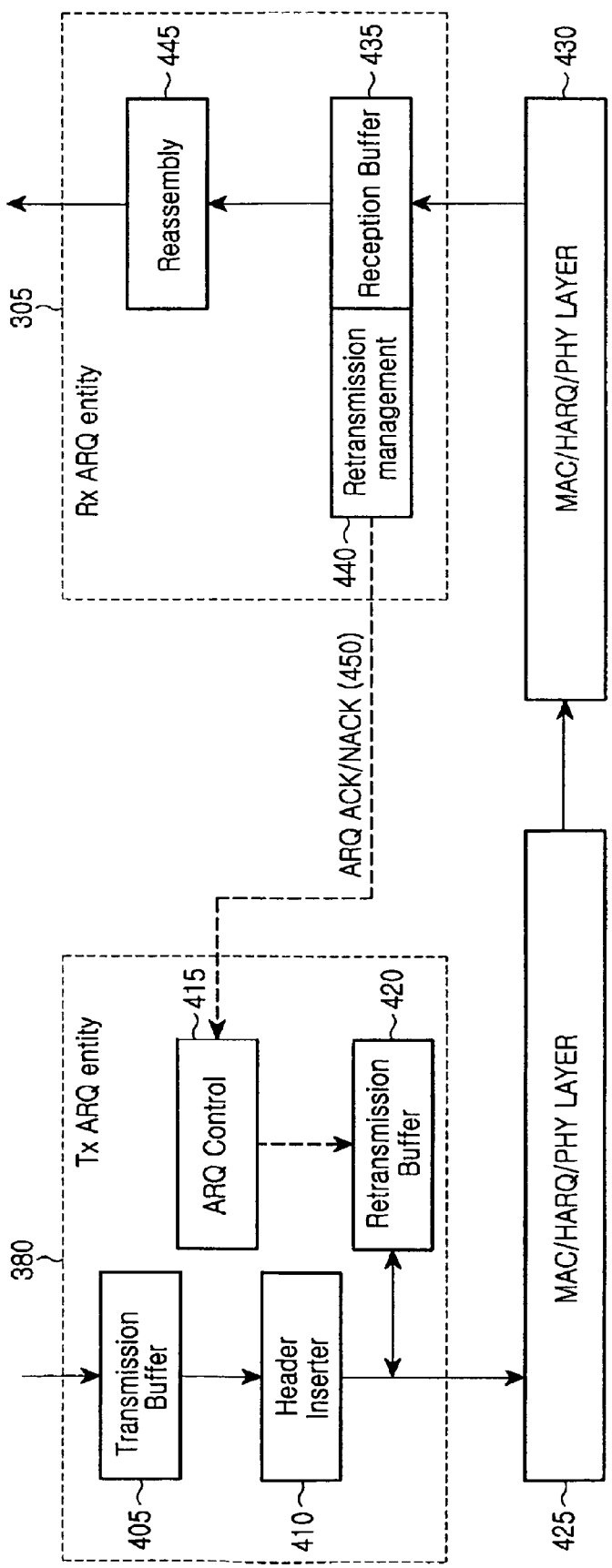
FIG. 4 is a block diagram illustrating a detailed structure of the ARQ entities for performing an outer ARQ operation in a general LTE system.
Figure 5:
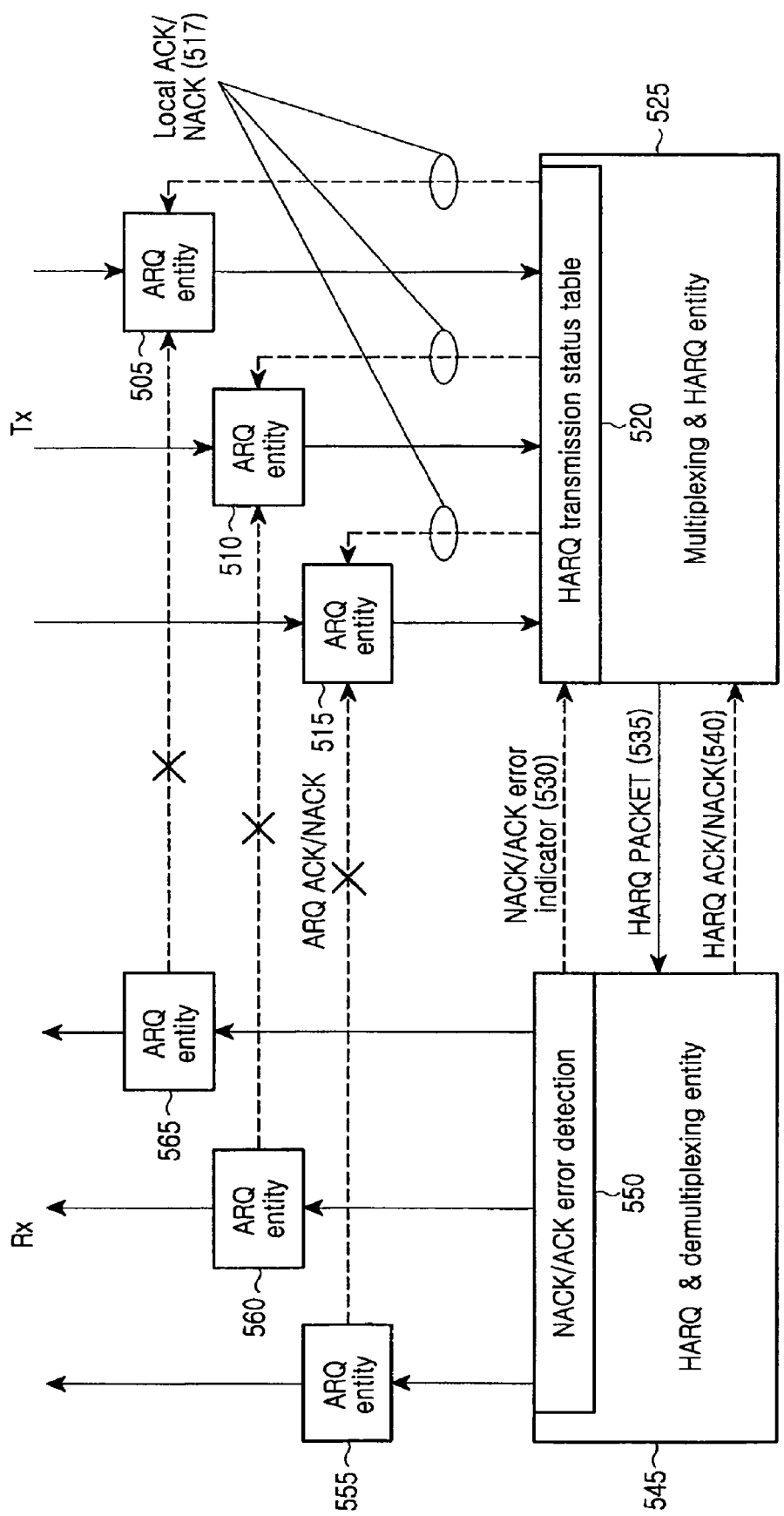
FIG. 5 is a block diagram illustrating a structure of an HARQ entity interworking with an ARQ entity in a mobile communication system according a first exemplary embodiment of the present invention.

FIG. 5 is a block diagram illustrating a structure of an HARQ entity interworking with an ARQ entity in a mobile communication system according a first exemplary embodiment of the present invention.

As illustrated, a transmitter includes transmitter's ARQ entities 505, 510 and 515, and a transmitter's HARQ entities 525, and a receiver includes a receiver's HARQ entity 545 and receiver's ARQ entities 555, 560 and 565. The transmitter's ARQ entities 505, 510 and 515 deliver ARQ packets to the transmitter's HARQ entity 525 together with SNs of the ARQ packets. Thereafter, the transmitter's HARQ entity 525 generates an HARQ packet by concatenating the ARQ packets. The transmitter's HARQ writes the information to indicate which ARQ packets compose the corresponding HARQ packet, in an HARQ transmission status table of FIG. 6. The transmitter's HARQ entity 525 transmits the HARQ packet to the receiver, and delivers local feedback signals (or local ACK/NACK signals) 517 indicating the transmission result to the transmitter's ARQ entities where the ARQ packets were generated.

In an exemplary embodiment of the present invention, the local ACK/NACK signals 517 are determined as follows.

1. If the transmitter's HARQ entity fails in HARQ transmission for a particular HARQ packet, it delivers local NACK signals 517 to corresponding ARQ entities. The fail in HARQ transmission occurs in a situation in which the transmitter's HARQ entity gives up transmission in an HARQ level because it has failed in transmission even though it has performed retransmission a predetermined number of retransmissions.

2. If the transmitter's HARQ entity succeeds in HARQ transmission for a particular HARQ packet and the success in HARQ transmission is caused by a NACK/ACK error, the transmitter's HARQ entity delivers a local NACK to the corresponding ARQ entities. The NACK/ACK error indicates an error in which an HARQ NACK signal is mistaken for an HARQ ACK signal. In this case, there is a need for retransmission in an ARQ level because the HARQ operation abnormally ends.

3. If the transmitter's HARQ entity succeeds in HARQ transmission for a particular HARQ packet and the success in HARQ transmission is not caused by a NACK/ACK error, the transmitter's HARQ entity delivers a local ACK to the corresponding ARQ entities.

The transmitter's ARQ entities 505, 510 and 515 discard corresponding ARQ packets from retransmission buffers upon receipt of a local ACK from the transmitter's HARQ entity 525. The transmitter's ARQ entities 505, 510, and 515 also retransmit the corresponding ARQ packets upon receipt of a local NACK from the transmitter's HARQ entity 525. The transmitter's HARQ entity 525 manages an HARQ transmission status table 520. In the receiver, the receiver's HARQ entity 545 includes a NACK/ACK error detection block 550. The NACK/ACK error detection block 550 detects whether there is an error generated for the HARQ packet received from the transmitter's HARQ entity 525, and transmits the detection result as a NACK/ACK error indicator 530. The NACK/ACK error indicator 530 includes a processor ID of an HARQ packet for which a NACK/ACK error has occurred (hereinafter referred to as a "NACK/ACK-error HARQ packet"), and information on a timestamp where the NACK/ACK-error HARQ packet was last received.

The HARQ transmission status table 520 is a table in which information on the HARQ packet is stored.

With reference to FIG. 6, a description will now be made of the HARQ transmission status table 520. FIG. 6 is a diagram illustrating an exemplary format of an HARQ transmission status table 520 according to an exemplary embodiment of the present invention. Information on the HARQ packet is stored in the HARQ transmission status table 520. In the HARQ transmission status table 520, each row corresponds to one HARQ packet, and each column represents information on the HARQ packet.

Referring to FIG. 6, information on the HARQ packet will be described. A processor ID 605 indicates an ID of an HARQ processor in charge of transmission/retransmission of an HARQ packet. A timestamp 610 indicates time information of the time at which transmission of the HARQ packet is completed. The completion of the HARQ packet transmission means that an HARQ ACK for the HARQ packet is received, or HARQ transmission is failed due to the retransmission limit or the time limit.

An ARQ packet ID 615 includes an ID of an ARQ entity where an ARQ packet constituting the HARQ packet is generated, and a sequence number (SN) written therein. For example, an HARQ packet 635 mapped to a first row is composed of an ARQ packet with SN=10 generated in an ARQ entity with ID=0, an ARQ packet with SN=123 generated in an ARQ entity with ID=1, and an ARQ packet with SN=34 generated in an ARQ entity with ID=3.

A transmission status 620 indicates success/fail in transmission of a corresponding HARQ packet. The transmitter's HARQ entity 525 delivers a local NACK to corresponding transmitter's ARQ entities using the ARQ packet ID 615 if it fails in HARQ packet transmission. For example, if the transmitter's HARQ entity 525 fails in transmission of the HARQ packet mapped to the first row, it delivers a local NACK for SN=10 to the ARQ entity with ID=0, a local NACK for SN=123 to the ARQ entity with ID=1, and a local NACK for SN=34 to the ARQ entity with ID=3.

A NACK/ACK error indicator 625 indicates whether there is a NACK/ACK error detected for the corresponding HARQ packet. If the transmitter's HARQ entity 525 receives a NACK/ACK error indicator 530 from a receiver's HARQ entity 545 within a predetermined time, it determines that there is a NACK/ACK error. However, if the transmitter's HARQ entity 525 fails to receive the NACK/ACK error indicator 530 within the predetermined time, it determines that there is no NACK/ACK error. The time used for determining whether there is the NACK/ACK error is implemented by a timer T, and an appropriate T value differs according to a transmission method of the NACK/ACK error indicator 530. If the NACK/ACK error indicator 530 is piggybacked on a general HARQ packet, the T value should be a time period that is long enough to complete the HARQ packet transmission. However, if the NACK/ACK error indicator 530 is transmitted over a physical channel, a short T value will be sufficient.

A timer 630 indicates whether the timer T has expired. The timer 630 has two kinds of values 'Expire' and 'Running'. If transmission of a particular HARQ packet is successful, the timer T starts, and if the NACK/ACK error indicator 530 is received before the timer T expires, the transmitter's HARQ entity 525 delivers a local NACK to the corresponding ARQ entities using information of the ARQ packet ID 615. For example, if the transmitter's HARQ entity 525 has succeeded in HARQ transmission of an HARQ packet 645 mapped to a third row and has received a NACK/ACK error indicator 530 from the receiver's HARQ entity 545 before the timer T expires, the transmitter's HARQ entity 525 delivers a local NACK for SN=12 to a transmitter's ARQ entity with ID=0 and a local NACK for SN=124 to a transmitter's ARQ entity with ID=1.

If transmission of a particular HARQ packet is successful, the timer T starts, and if the timer T expires before the NACK/ACK error indicator 530 is received, the transmitter's HARQ entity 525 delivers a local ACK to corresponding ARQ entities using information of the ARQ packet ID 615. For example, if the transmitter's HARQ entity 525 has succeeded in HARQ transmission of an HARQ packet 640 mapped to a second row and the timer T expires before the NACK/ACK error indicator 530 is received, the transmitter's HARQ entity 525 delivers a local ACK for SN=11 to an ARQ entity with ID=0, a local ACK for SN=74 to an ARQ entity with ID=2, and a local ACK for SN=34 to an ARQ entity with ID=3.

In some cases, the HARQ entity sets the T to 0, and thus can immediately deliver a local ACK to an associated ARQ entity upon receipt of an HARQ ACK. When the VoIP service, which is susceptible to the delay but does not have the high request reliability, is retransmitted along with the information indicating occurrence of the NACK/ACK error, the required delay cannot be satisfied. It is preferable that for such a service, ARQ retransmission depending on occurrence of the NACK/ACK error is not performed basically, but the ARQ retransmission is performed in the case where the transmission is failed even though retransmission was performed as many times as the number of retransmissions predefined in HARQ. In this case, by setting the T to 0, the HARQ entity can perform ARQ retransmission only in the case where it fails in transmission even though it performed the retransmission as many times as the number of retransmissions predefined in HARQ.

A description has been made of the process in which the transmitter's HARQ entity 525 generates a local ACK/NACK using the HARQ transmission status table of FIG. 6, and delivers the local ACK/NACK to a corresponding ARQ entity. Next, a description will be made of a method in which the receiver's HARQ entity 545 detects a NACK/ACK error for an HARQ packet and reports this to the transmitter's HARQ entity 525.

Figure 7:
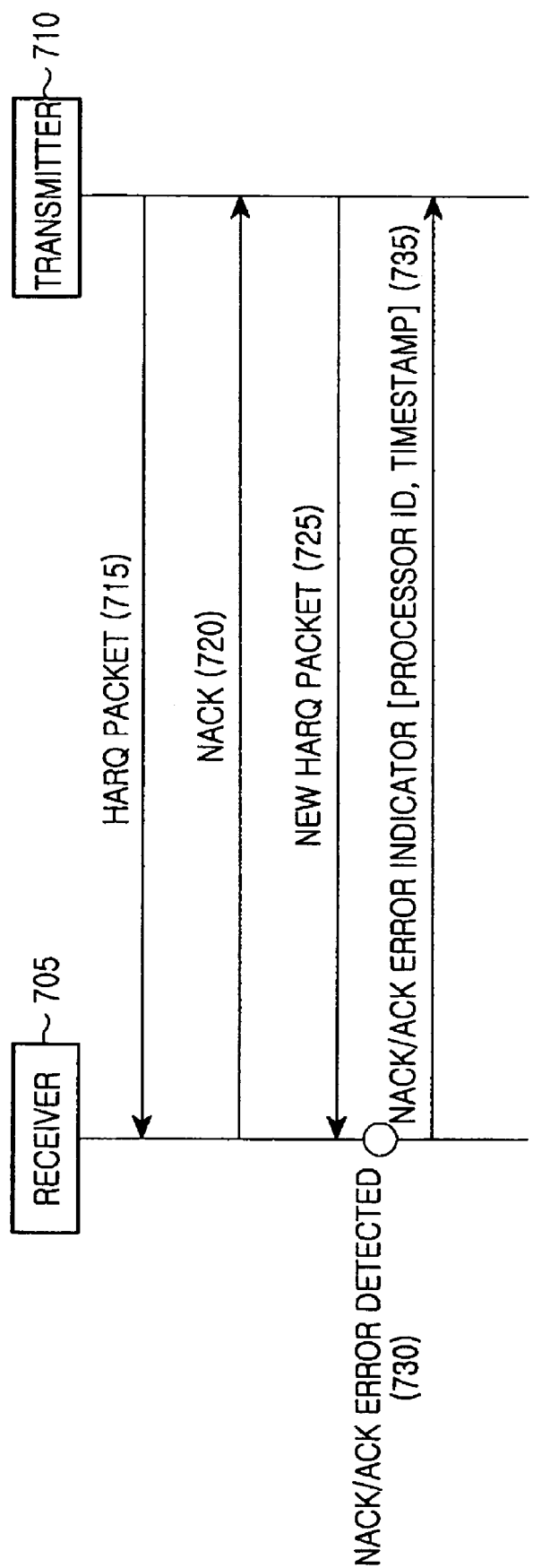
FIG. 7 is a flowchart illustrating a process of detecting, by a receiver, a NACK/ACK error for an HARQ packet and reporting the detection result to a transmitter according to the first exemplary embodiment of the present invention.

FIG. 7 is a flowchart illustrating a process of detecting, by a receiver, a NACK/ACK error for an HARQ packet and reporting the detection result to a transmitter according to a first exemplary embodiment of the present invention.

If a receiver's HARQ entity receives a new HARQ packet through a particular HARQ processor even though it transmitted a NACK for the HARQ packet transmitted through the HARQ processor, the receiver's HARQ entity will determine that there is a NACK/ACK error. Even though the NACK transmission was performed to request retransmission of the corresponding HARQ packet, a new HARQ packet is transmitted if there is a NACK/ACK error. Therefore, the receiver's HARQ entity may regard this as a NACK/ACK error. For convenience, operations of the receiver's HARQ entity and the transmitter's HARQ entity will be described from the viewpoint of the transmitter and the receiver.

Referring to FIG. 7, in step 715, a receiver 705 receives an arbitrary HARQ packet through an HARQ processor x. Even though the receiver 705 transmits an HARQ NACK for the HARQ packet in step 720, if a new HARQ packet other than the retransmitted HARQ packet is received through the HARQ processor x in step 725, the receiver 705 considers in step 730 that there is a NACK/ACK error. Then, in step 735, the receiver 705 transmits a NACK/ACK error indicator 530 described in FIG. 5 to a transmitter 710. The NACK/ACK error indicator includes a processor ID 605 of the NACK/ACK-error HARQ packet and a timestamp 610 for the time where the NACK/ACK-error HARQ packet was last received. For example, a value x and the time where the corresponding HARQ packet was received are inserted in the NACK/ACK error indicator as the HARQ processor ID and the timestamp, respectively.

The timestamp included in the NACK/ACK error indicator is the information based on a transmitter's HARQ entity can determine in which HARQ packet the NACK/ACK error has occurred.

In an exemplary embodiment of the present invention, an HARQ entity of the transmitter 710 manages the last transmission time of a particular HARQ packet using the timestamp. If there is a NACK/ACK error in the HARQ packet, the time when the NACK/ACK-error HARQ packet was last received is substantially equal to the last transmission time of the NACK/ACK-error HARQ packet. Therefore, upon receipt of the NACK/ACK error indicator, the HARQ entity of the transmitter 710 determines that there is a NACK/ACK error in the HARQ packet comprising the same HARQ processor ID and timestamp as the HARQ processor ID and timestamp included in the NACK/ACK error indicator among the entries of the HARQ transmission status table of FIG. 6.

In the method illustrated in FIG. 7, the HARQ entity of the receiver 705 should undesirably memorize the last reception time of the NACK/ACK-error HARQ packet. In another method for solving this problem, the time when the HARQ entity of the receiver 705 recognized occurrence of the NACK/ACK error can be used as the time information, such as a timestamp, of the NACK/ACK error indicator.

That is, the time when the HARQ of the receiver 705 recognizes an occurrence of the NACK/ACK error can be regarded as the time when a new HARQ packet is transmitted through the HARQ processor waiting for retransmission. According to an exemplary implementation, upon recognizing an occurrence of the NACK/ACK error, the HARQ entity of the receiver 705 generates a NACK/ACK error indicator including the reception time of the new HARQ packet as the timestamp, and transmits the NACK/ACK error indicator to the transmitter 710.

Upon receipt of the NACK/ACK error indicator, the HARQ entity of the transmitter 710 selects HARQ packets comprising the same HARQ processor ID as the HARQ processor ID of the NACK/ACK error indicator among the entries stored in the HARQ transmission status table of FIG. 6. The HARQ entity of the transmitter 710 recognizes, as a NACK/ACK-error HARQ packet, the HARQ packet comprising the timestamp which is less than but nearest to the timestamp of the NACK/ACK error indicator among the selected HARQ packets.

This is because while the timestamp stored in the HARQ transmission status table is information on the last transmission time of the NACK/ACK-error HARQ packet, the timestamp reported by the NACK/ACK error indicator is information on the first transmission time of the next HARQ packet of the NACK/ACK-error HARQ packet.

Next, with reference to FIG. 8, a description will be made of an operation performed by the transmitter's HARQ entity upon detecting a NACK/ACK error.

Figure 8:
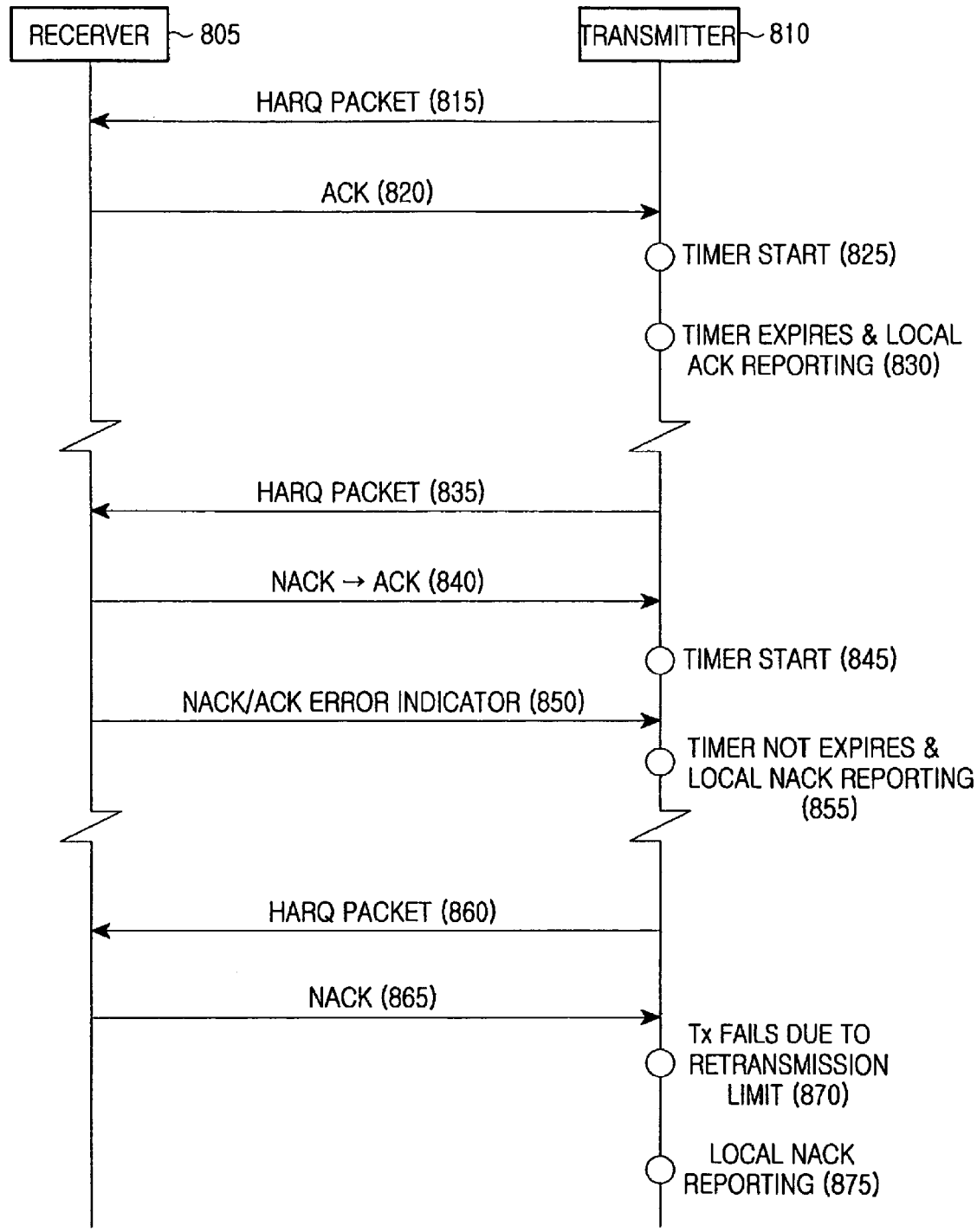
FIG. 8 is a signaling diagram illustrating a process of reporting a local ACK/NACK to an ARQ entity by a transmitter's HARQ entity according to the first exemplary embodiment of the present invention.

FIG. 8 is a signaling diagram illustrating a process of reporting a local ACK/NACK to an ARQ entity by a transmitter's HARQ entity according to a first exemplary embodiment of the present invention.

FIG. 8 illustrates three possible cases occurring between a transmitter 810 reporting a local ACK/NACK and a receiver 805 according to an exemplary embodiment of the present invention. Referring to FIG. 8, in step 815, an HARQ entity of the transmitter 810 transmits an HARQ packet to an HARQ entity of the receiver 805. In step 820, the HARQ entity of the receiver 805 receives the HARQ packet, soft-combines the HARQ packet that is received with the previously received HARQ packet, and transmits an HARQ ACK for the HARQ packet if it has succeeded in HARQ packet reception. Then, in step 825, the HARQ entity of the transmitter 810 starts a timer upon receipt of the HARQ ACK for the HARQ packet.

Since the HARQ entity of the receiver 805 does not transmit a NACK/ACK error indicator 625 in the first case, the transmitter 810 does not receive the NACK/ACK error indicator 625 until a predetermined time T of the timer expires. Therefore, the HARQ entity of the transmitter 810 delivers a local ACK to a corresponding transmitter's ARQ entity in step 830.

In a second case, a NACK/ACK error has occurred. In this case, if the HARQ entity of the transmitter 810 transmits an HARQ packet in step 835, the HARQ entity of the receiver 805 receives the HARQ packet, and soft-combines the received HARQ packet with the previously received HARQ packet. However, the HARQ entity fails in reception of the HARQ packet, thus transmitting an HARQ NACK for the HARQ packet. However, in step 840, because a NACK/ACK error occurs in the HARQ NACK, the HARQ entity of the transmitter 810 recognizes the HARQ NACK as an HARQ ACK. The HARQ entity of the transmitter 810 starts the timer in step 845, and the HARQ entity of the receiver 805 transmits a NACK/ACK error indicator 625 in step 850 before a predetermined time T of the timer expires. Because the HARQ entity of the transmitter 810 has received the NACK/ACK error indicator 625 before the predetermined time T expires, it delivers a local NACK to a corresponding transmitter's ARQ entity in step 855.

In a third case, if the HARQ entity of the transmitter 810 transmits an HARQ packet in step 860, the HARQ entity of the receiver 805 receives the HARQ packet and soft-combines the received HARQ packet with the previously received HARQ packet. However, the HARQ entity fails in reception of the HARQ packet and thus, transmits an HARQ NACK for the HARQ packet in step 865. However, if the HARQ entity of the transmitter 810 can no longer retransmit the HARQ packet in an HARQ level due to the retransmission limit for the corresponding HARQ packet in step 870, the HARQ entity of the transmitter 810 delivers a local NACK to the corresponding transmitter's ARQ entity in step 875.

As described above, in an exemplary embodiment of the present invention, the transmitter, after transmitting an ARQ packet, receives no retransmission request for the ARQ packet until a predetermined time expires, the transmitter can discard the ARQ packet from the transmission buffer, considering that the ARQ packet has been normally transmitted. Therefore, according to an exemplary embodiment of the present invention, the transmitter's ARQ entity and the receiver's ARQ entity do not need to exchange ARQ ACK signals. This will prevent the waste of resources due to the exchange of the ARQ ACK signals.

Next, an operation of the transmitter's HARQ entity will be described with reference to FIG. 9.

Figure 9:
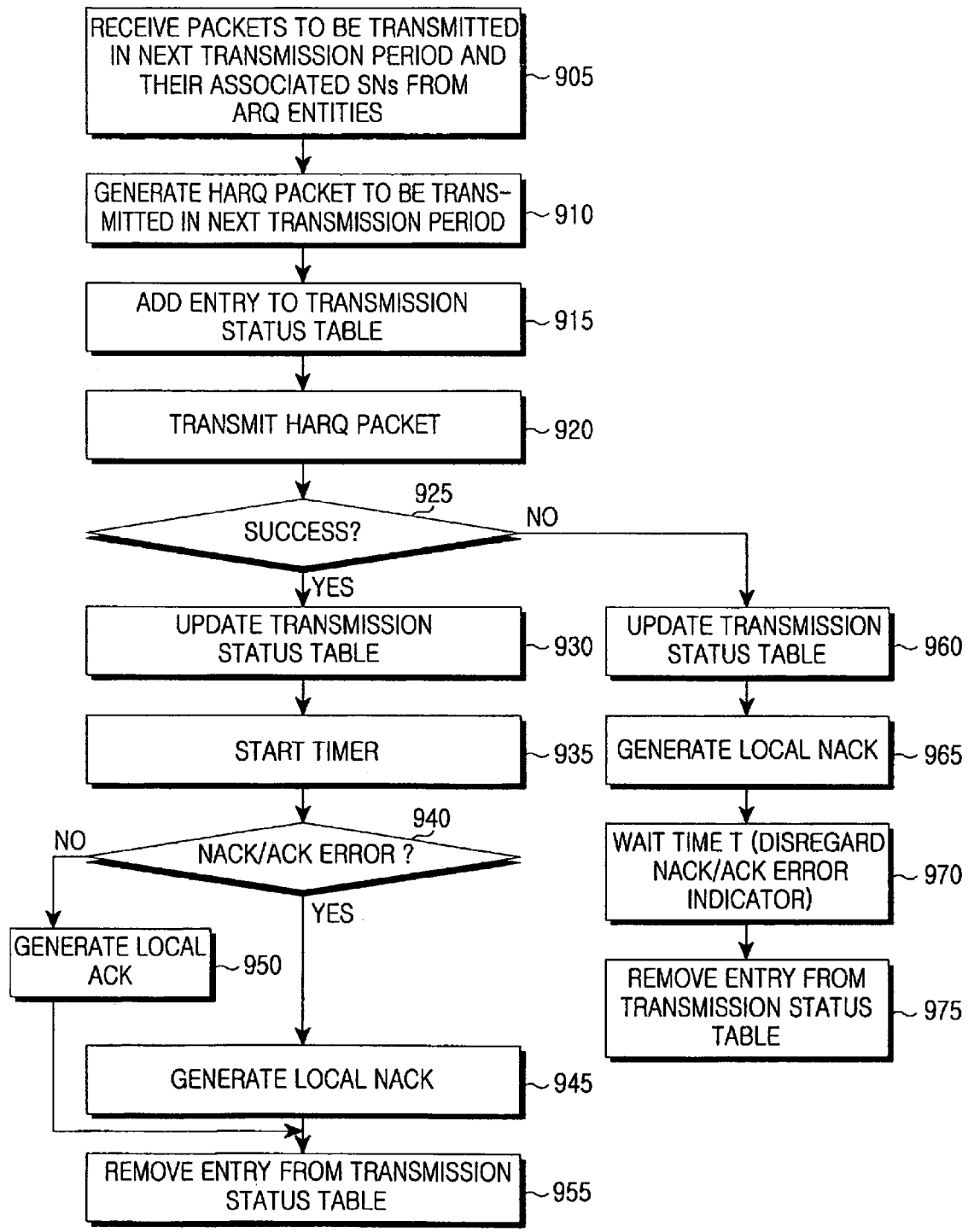
FIG. 9 is a flowchart illustrating an operation performed by a transmitter's HARQ entity according to the first exemplary embodiment of the present invention.

FIG. 9 is a flowchart illustrating an operation performed by a transmitter's HARQ entity according to a first exemplary embodiment of the present invention.

Referring to FIG. 9, in step 905, a transmitter's HARQ entity 525 receives transmission ARQ packets and SNs thereof provided from transmitter's ARQ entities 505, 510 and 515. In step 910, the transmitter's HARQ entity 525 generates an HARQ packet to be transmitted in the next transmission period by concatenating the ARQ packets. In step 915, the transmitter's HARQ entity 525 adds a transmission HARQ packet item to an HARQ transmission status table 520, and writes IDs of the ARQ entities 505, 510 and 515, and SNs of the ARQ packets, in an ARQ packet ID 615. In step 920, the transmitter's HARQ entity 525 transmits the HARQ packet. Thereafter, an operation of the transmitter's HARQ entity 525 differs according to a success or failure of transmission of the HARQ packet.

In step 925, the transmitter's HARQ entity 525 determines whether it has succeeded in transmission of the HARQ packet. If the transmitter's HARQ entity 525 has succeeded in transmission of the HARQ packet, it proceeds to step 930. For example, if the transmitter's HARQ entity 525 has received an HARQ ACK from a receiver's HARQ entity 545 before it encounters the retransmission limit, the transmitter's HARQ entity 525 proceeds to step 930. However, if the transmitter's HARQ entity 525 has failed in transmission of the HARQ packet, it proceeds to step 960 to update the transmission status table. More specifically, if the transmitter's HARQ entity 525 has given up the transmission in the HARQ level as it encounters the retransmission limit, it proceeds to step 960.

Upon receipt of the HARQ ACK indicating success in reception of the HARQ packet from receiver's HARQ entity 545, the transmitter's HARQ entity 525 writes 'success' in a transmission status 620 of the HARQ transmission status table 520 in step 930. Thereafter, in step 935, the transmitter's HARQ entity 525 starts the timer. According to an exemplary implementation, the timer starts when a new HARQ packet is transmitted through the same HARQ processor. For example, if an ACK for the HARQ packet transmitted through an HARQ processor with processor ID=x is received, the transmitter's HARQ entity 525 starts a predetermined time T while transmitting a new HARQ packet through the processor x.

If a NACK/ACK error indicator is not received in step 940 until the predetermined time T of the timer expires, the transmitter's HARQ entity 525 proceeds to step 950. However, if a NACK/ACK error indicator is received before the time T expires, the transmitter's HARQ entity proceeds to step 945.

In step 945, the transmitter's HARQ entity 525 makes a local NACK, delivers the local NACK to corresponding ARQ entities, and then proceeds to step 955. In step 950, the transmitter's HARQ entity 525 makes a local ACK, delivers the local ACK to the corresponding transmitter's ARQ entities, and then proceeds to step 955. In step 955, the transmitter's HARQ entity 525 removes a row associated with the corresponding HARQ packet from the HARQ transmission status table, and then ends the operation of FIG. 9.

Once the NACK signal is received from the receiver's HARQ entity 545 in step 925, the transmitter's HARQ entity 525 writes 'fail' in the transmission status 620 of the HARQ transmission status table 520 in step 960. Thereafter, in step 965, the transmitter's HARQ entity 525 makes a local NACK and delivers the local NACK to the corresponding transmitter's ARQ entities. Then, in step 970, the transmitter's HARQ entity 525 starts the timer, and does not generate the local NACK until a predetermined time T of the timer expires even though it receives a NACK/ACK error indicator for the HARQ packet associated with the local NACK generated in step 965.

The local NACK-prohibited interval of the time T is defined in step 970 because the transmitter's HARQ entity 525 transmits a new HARQ packet with the same HARQ processor when the transmitter's HARQ entity 525 gives up retransmission in the HARQ level due to the retransmission limit, and the receiver's HARQ processor 545 recognizes the new HARQ packet as a NACK/ACK error, and transmits the NACK/ACK error indicator. Thereafter, in step 975, the transmitter's HARQ entity 525 removes a row associated with the corresponding HARQ packet from the HARQ transmission status table, and ends the process.

Figure 10:
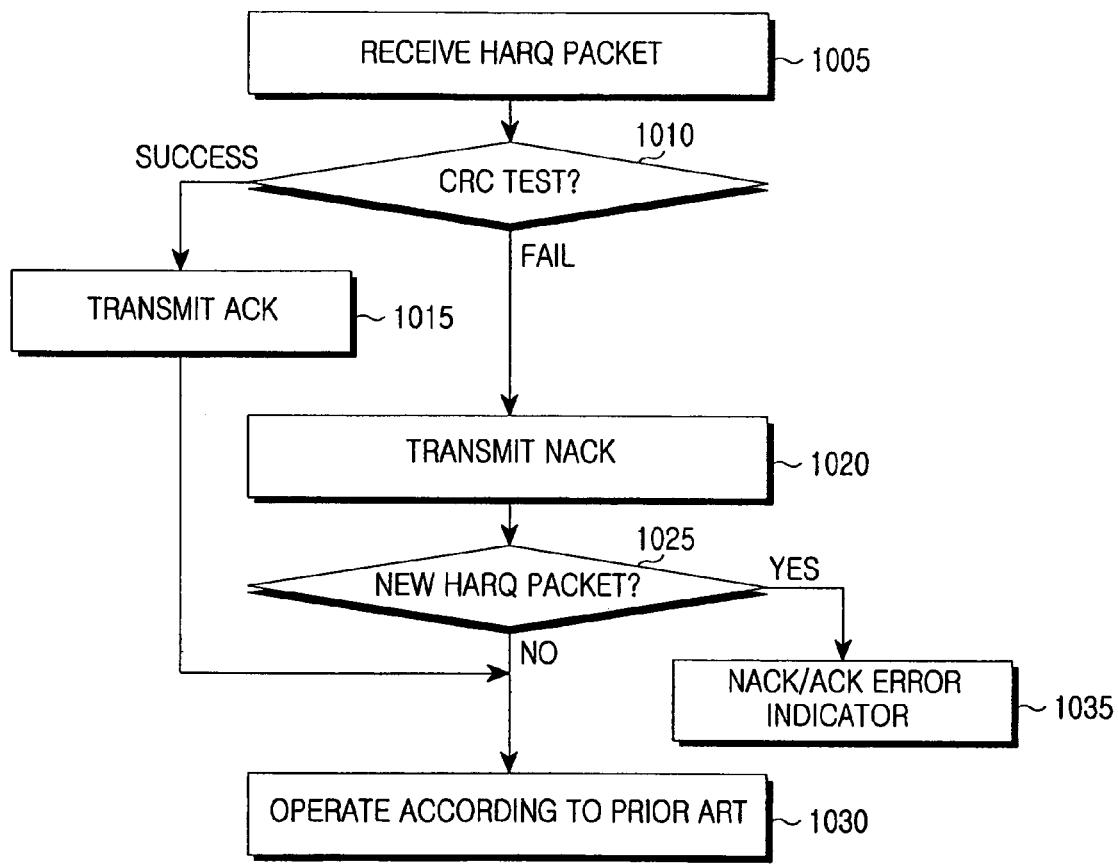
FIG. 10 is a flowchart illustrating an operation performed in a receiver's HARQ entity according to the first exemplary embodiment of the present invention.

FIG. 10 is a flowchart illustrating an operation performed in a receiver's HARQ entity according to a first exemplary embodiment of the present invention.

Referring to FIG. 10, if a receiver's HARQ entity 545 receives in step 1005, it performs CRC test on the HARQ packet in step 1010. If a determination is made that there is no error in the HARQ packet as a result of the CRC test, the receiver's HARQ entity 545 proceeds to step 1015. However, if there is an error in the HARQ packet, the receiver's HARQ entity 545 proceeds to step 1020.

In step 1015, the receiver's HARQ entity 545 transmits an HARQ ACK for the HARQ packet, and then proceeds to step 1030 where it operates in the conventional manner. However, in step 1020, the receiver's HARQ entity 545 transmits an HARQ NACK for the HARQ packet, and then proceeds to step 1025 where it waits for an HARQ packet transmitted through the same HARQ processor as the HARQ processor through which the HARQ packet was transmitted. If the HARQ packet is a retransmitted HARQ packet, the receiver's HARQ entity 545 proceeds to step 1030 where it operates according to the conventional technology.

However, if a determination is made in step 1025 that the HARQ packet is a new HARQ packet, the receiver's HARQ entity 545 proceeds to step 1035 where it transmits a NACK/ACK error indicator. The NACK/ACK error indicator should be transmitted before a predetermined timer expires, and the timer starts at the time where the receiver's HARQ entity 545 receives an HARQ packet in step 1025. The NACK/ACK error indicator includes information used for identifying a NACK/ACK-error HARQ packet, such as a processor ID of the NACK/ACK-error HARQ packet, and time information (or timestamp) for the NACK/ACK error-occurred time or a NACK/ACK error-recognized time.

Next, a second exemplary embodiment of the present invention will be described. The proposed second exemplary embodiment of the present invention omits the NACK/ACK error detection function performed by the receiver's HARQ entity 545 in the first exemplary embodiment. This minimizes the complexity of the HARQ transmission/reception apparatus and secures fast retransmission on the HARQ packet, transmission of which was failed in the HARQ level. To this end, in the second exemplary embodiment of the present invention, the transmitter's HARQ entity delivers a local NACK to a transmitter's ARQ entity to request retransmission of the corresponding ARQ packet. However, the transmitter's HARQ entity does not generate a local ACK, and instead, the receiver's ARQ entity transmits an ACK/NACK in an ARQ level as done in the conventional method. That is, the second exemplary embodiment maintains the conventional ARQ function, and allows the HARQ to support even the ARQ retransmission. A different scheme is proposed in the system comprising both the ARQ NACK transmitted by the receiver's ARQ entity and the local NACK transmitted by the transmitter's HARQ entity. This scheme is proposed because one packet loss may be composed of two retransmissions. In this scheme, the transmitter's ARQ entity processes a local NACK and an ARQ NACK independently.

Figure 11:
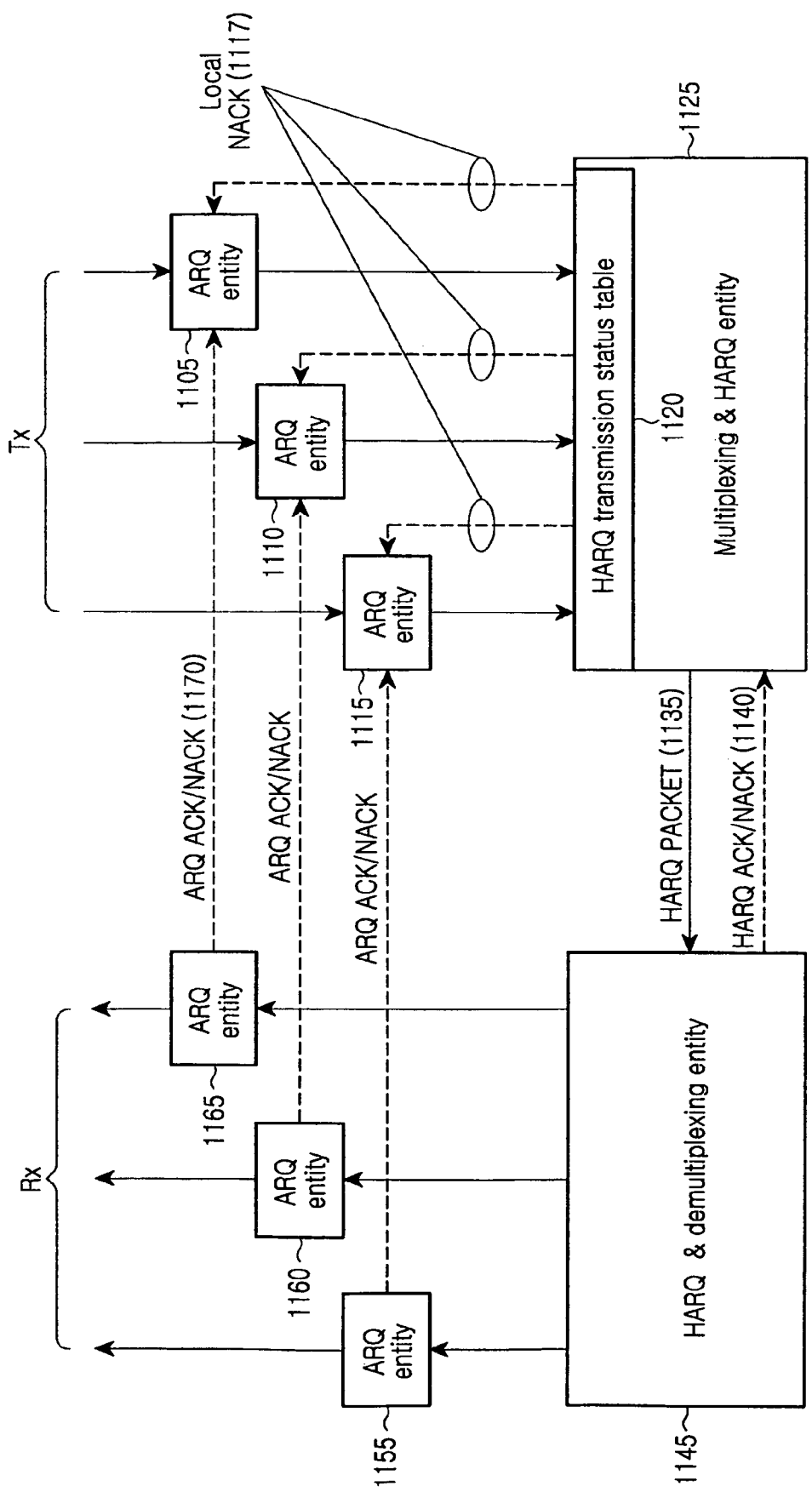
FIG. 11 is a block diagram illustrating a structure of an HARQ entity interworking with an ARQ entity in a mobile communication system according to a second exemplary embodiment of the present invention.

FIG. 11 is a block diagram illustrating a structure of an HARQ entity interworking with an ARQ entity in a mobile communication system according to a second exemplary embodiment of the present invention.

In the HARQ system as illustrated in FIG. 11 according to the second exemplary embodiment of the present invention, a transmitter includes transmitter's ARQ entities 1105, 1110 and 1115, and a transmitter's HARQ entity 1125, and a receiver includes a receiver's HARQ entity 1145 and receiver's ARQ entities 1155, 1160 and 1165.

It is assumed that the HARQ system according to this exemplary embodiment uses, as a NACK signal for an ARQ packet, both an ARQ NACK transmitted from a receiver's ARQ entity to a transmitter's ARQ entity, and a local NACK delivered from the transmitter's HARQ entity to the transmitter's ARQ entity.

The transmitter's ARQ entities 1105, 1110 and 1115 deliver ARQ packets to the transmitter's HARQ entity 1125 together with SNs thereof. The transmitter's HARQ entity 1125 makes an HARQ packet by concatenating the ARQ packets, and writes, in an HARQ transmission status table 1120, the information indicating of which ARQ packets the corresponding HARQ packet is composed. The transmitter's HARQ entity 1125 transmits the generated HARQ packet to the receiver, and delivers local NACK signals 1117 to transmitter's ARQ entities where the ARQ packets constituting the HARQ packet are generated.

The local NACK is generated when HARQ transmission for a particular HARQ packet is failed. If there is a failure in HARQ transmission, the transmitter's HARQ entity gives up transmission in an HARQ level because it has failed in transmission even though it has performed retransmission a predetermined number of retransmissions. The HARQ transmission status table 1120 is a table in which information on the HARQ packet is stored. The HARQ transmission status table 1120 has the information written to indicate which ARQ packets compose the HARQ packet. The transmitter's HARQ entity 1125 delivers a local NACK 1117 to the corresponding ARQ entity depending on the HARQ transmission status table 1120 if it fails in HARQ transmission for the HARQ packet.

The receiver's ARQ entity verifies an SN of the received ARQ packet to detect a received status of the ARQ packet. The receiver's ARQ entity transmits an ARQ ACK 1170, for a normally received ARQ packet, and transmits an ARQ NACK 1170, for a missing ARQ packet.

Upon receipt of the ARQ NACK or the local NACK, each of the transmitter's ARQ entities 1105, 1110 and 1115 performs retransmission so as to prevent duplicate retransmission of the corresponding ARQ packet. A description thereof will be made with reference to FIGS. 12 and 13.

In the situation where both the local NACK and the ARQ NACK are allowed according to the second exemplary embodiment of the present invention, the following scenarios may happen.

When HARQ transmission for a particular ARQ packet is failed, a local NACK and an ARQ NACK are both generated for the corresponding ARQ packet. Here, the local NACK is generated earlier than the ARQ NACK. If a particular ARQ packet is lost as a result of factors unrelated to the HARQ transmission failure, the local NACK is not generated, and only the ARQ NACK is generated. For example, because the transmitter's HARQ entity cannot detect the packet loss due to the ARQ NACK/ACK error, it does not generate the local NACK.

The following conclusions can be obtained from the foregoing details. If a local NACK for a particular ARQ packet is received from the transmitter's ARQ entities 1105, 1110 and 1115, an ARQ NACK for the same ARQ packet will arrive quickly. Therefore, if retransmission was performed for the local NACK, it is preferable not to perform retransmission for the ARQ NACK. In addition, if the transmitter's ARQ entities 1105, 1110 and 1115 have received an ARQ NACK before they receive a local NACK for a particular ARQ packet, it is preferable to perform retransmission for the corresponding ARQ packet. In other words, a determination of whether to respond to the ARQ NACK should be made according to whether a local NACK for the same packet was received before reception of the ARQ NACK.

Figure 12:
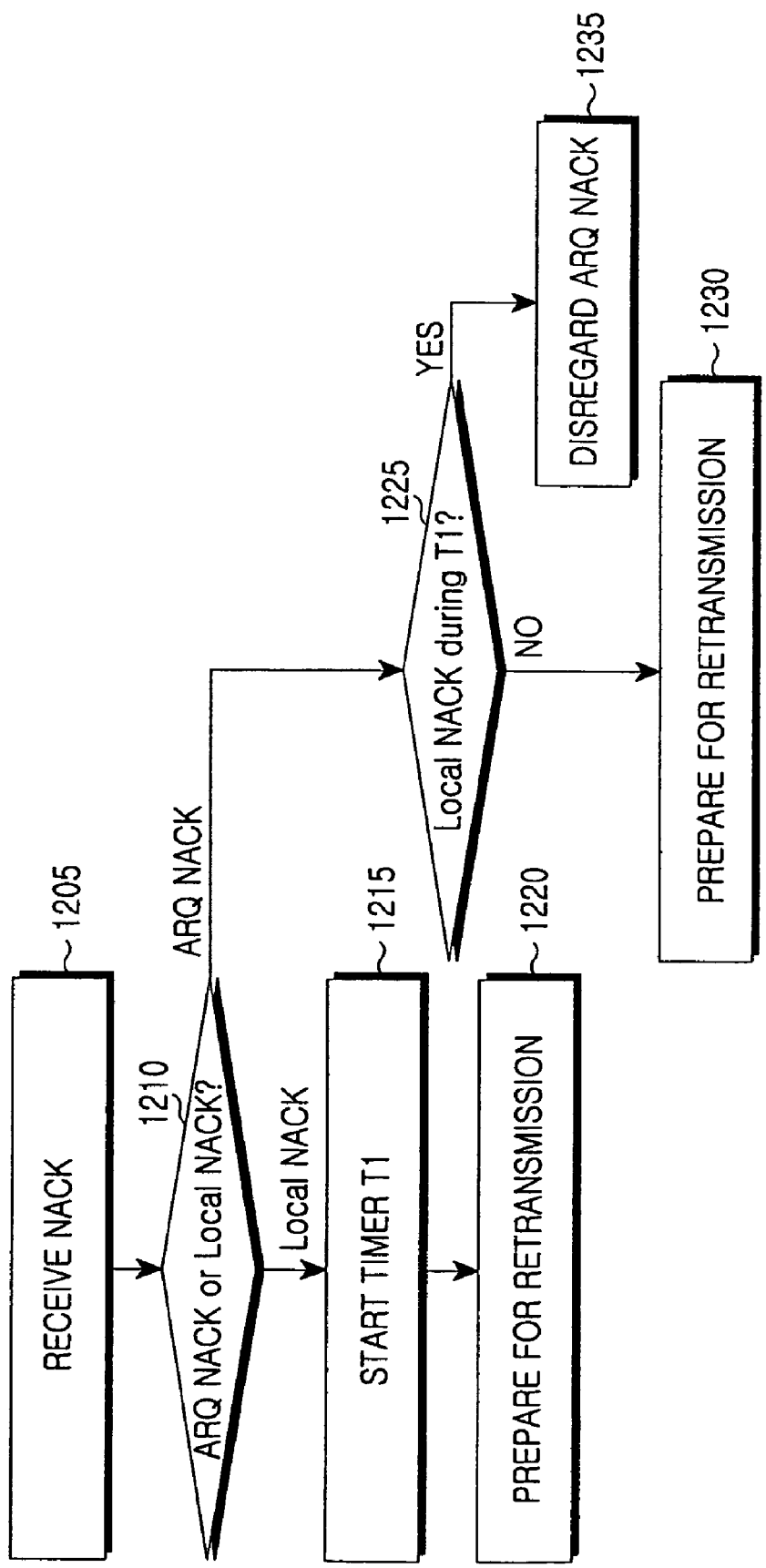
FIG. 12 is a flowchart illustrating an operation performed in a transmitter's ARQ entity according to the second exemplary embodiment of the present invention.

FIG. 12 is a flowchart illustrating an operation performed in a transmitter's ARQ entity according to the second exemplary embodiment of the present invention.

Referring to FIG. 12, it is assumed in step 1205 that each of the transmitter's ARQ entities 1105, 1110 and 1115 receives a NACK signal. Then the transmitter's ARQ entity determines in step 1210 whether the received NACK signal is an ARQ NACK or a local NACK. If the received NACK signal is a local NACK, the transmitter's ARQ entity proceeds to step 1215. However, if the received NACK signal is an ARQ NACK, the transmitter's ARQ entity proceeds to step 1225.

If it is determined in step 1210 that the received NACK signal is a local NACK signal, the transmitter's ARQ entity starts a timer Ti in step 1215, and prepares for retransmission of the corresponding ARQ packet in step 1220. Here, upon receipt of the local NACK, the transmitter's ARQ entity starts the timer and then disregards the ARQ NACKs received until the timer expires.

However, if it is determined in step 1210 that the received NACK signal is an ARQ NACK signal, the transmitter's ARQ entity determines in step 1225 whether a local NACK for the ARQ packet retransmission-requested by the ARQ NACK has ever been received during the previous Ti. If the local NACK for the corresponding ARQ packet has been received during the previous Ti, the transmitter's ARQ entity proceeds to step 1235 where it disregards an ARQ NACK for the ARQ packet. However, if the local NACK for the corresponding ARQ packet has never been received during the previous Ti, the transmitter's ARQ entity proceeds to step 1230 where it prepares for retransmission of the corresponding ARQ packet.

Figure 13:
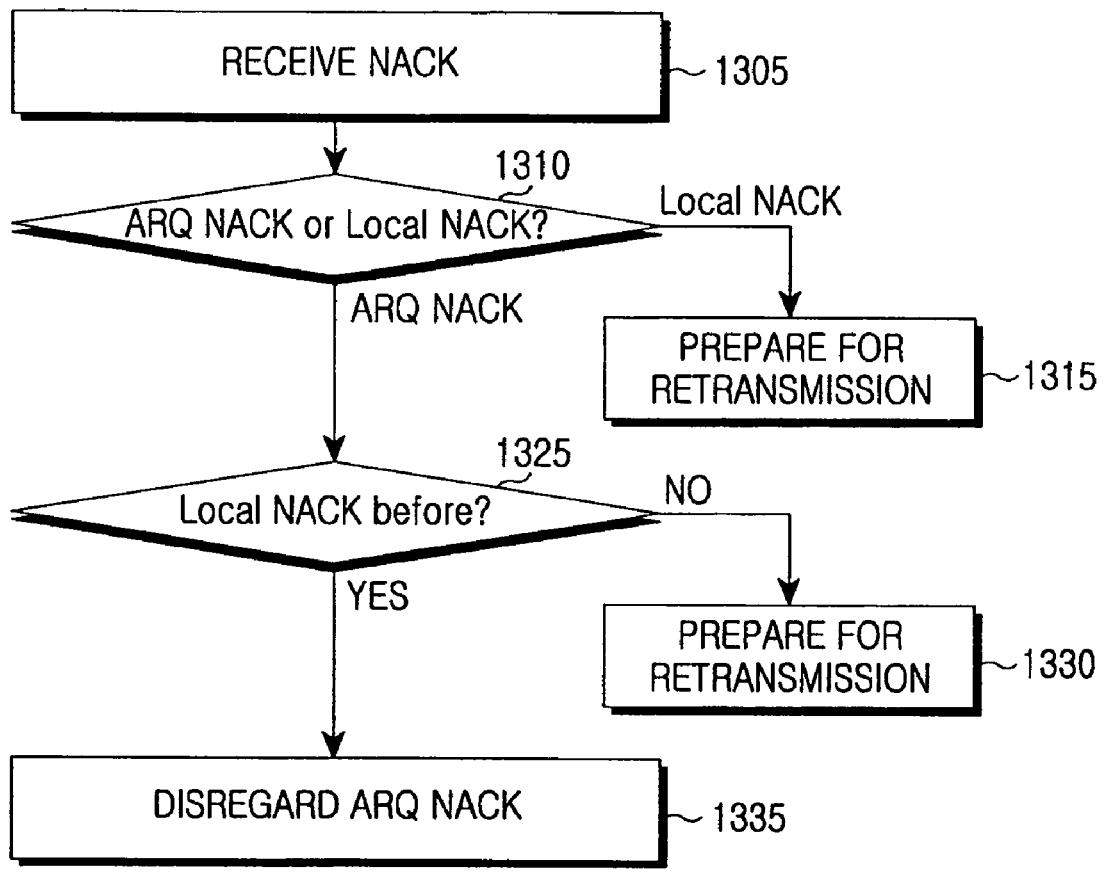
FIG. 13 is a flowchart illustrating an operation performed in a transmitter's ARQ entity according to another aspect of the second exemplary embodiment of the present invention.

FIG. 13 is a flowchart illustrating an operation performed in a transmitter's ARQ entity according to another aspect of the second exemplary embodiment of the present invention.

In this exemplary embodiment of the present invention, each of the transmitter's ARQ entities 1105, 1110 and 1115 of FIG. 11 does not use a timer, and disregards an ARQ NACK for the ARQ packet, for which it has already received a local NACK.

Referring to FIG. 13, it is assumed in step 1305 that each of the transmitter's ARQ entities 1105, 1110 and 1115 receives a NACK signal. The transmitter's ARQ entity determines in step 1310 whether the received NACK signal is an ARQ NACK or a local NACK. If it is determined that the received NACK signal is a local NACK delivered from a transmitter's HARQ entity, the transmitter's ARQ entity proceeds to step 1315 where it prepares for retransmission of the ARQ packet retransmission-requested by the local NACK.

However, if it is determined in step 1310 that the received NACK signal is an ARQ NACK transmitted from a receiver's ARQ entity, the transmitter's ARQ entity proceeds to step 1325 where it determines whether a local NACK for the ARQ packet retransmission-requested by the ARQ NACK has ever been received. If the local NACK for the corresponding ARQ packet has ever been received, the transmitter's ARQ entity proceeds to step 1335 where it disregards the ARQ NACK. However, if the local NACK for the corresponding ARQ packet has never been received, the transmitter's ARQ entity proceeds to step 1330 where it prepares for retransmission of the corresponding ARQ packet.

Figure 14:
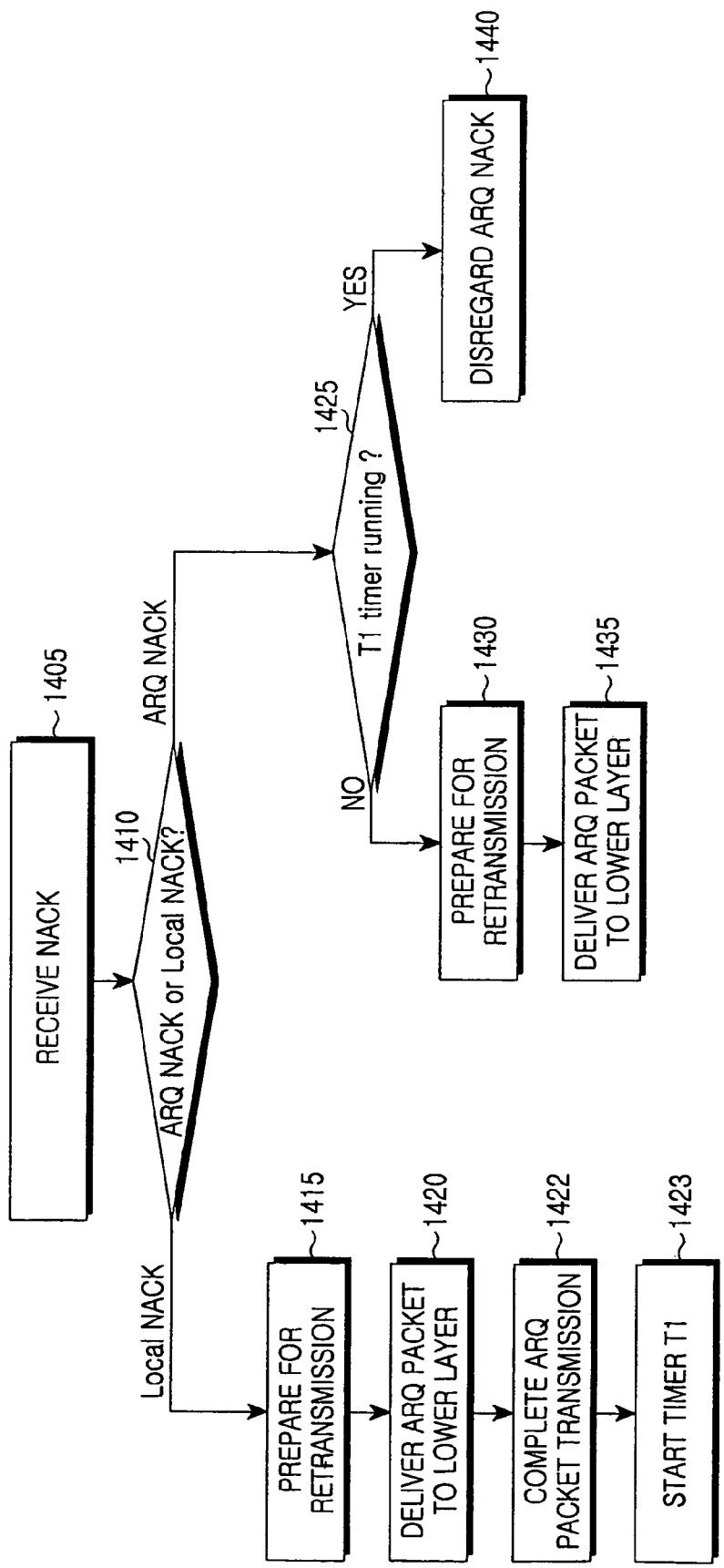
FIG. 14 is a flowchart illustrating an operation performed in a transmitter's ARQ entity according to further another aspect of the second exemplary embodiment of the present invention.

FIG. 14 is a flowchart illustrating an operation performed in a transmitter's ARQ entity according to another aspect of the second exemplary embodiment of the present invention.

In this exemplary embodiment of the present invention, a transmitter's ARQ entity interworking with a transmitter's HARQ entity can determine a transmission end time of a particular ARQ packet. After the transmitter's HARQ entity transmits an HARQ packet, the time where the HARQ packet caused by the HARQ ACK is transmitted corresponds to the time where transmission of the ARQ packet included in the HARQ packet is completed if an HARQ ACK for the HARQ packet is received.

In the exemplary embodiment of the present invention as illustrated in FIG. 14, if the transmitter's ARQ entity performs retransmission on a particular ARQ packet, it starts a timer Ti at the time when retransmission of the corresponding ARQ packet is completed, and if retransmission of an ARQ level is requested for the corresponding ARQ packet before the timer TI expires, the transmitter's ARQ entity disregards the retransmission request.

Referring to FIG. 14, it is assumed in step 1405 that each of the transmitter's ARQ entities 1105, 1110 and 1115 receives a NACK signal. The transmitter's ARQ entity determines in step 1410 whether the received NACK signal is an ARQ NACK or a local NACK. If it is determined that the received NACK signal is a local NACK, the transmitter's ARQ entity proceeds to step 1415. However, if the received NACK signal is an ARQ NACK, the transmitter's ARQ entity proceeds to step 1425. In step 1415, the transmitter's ARQ entity prepares for retransmission of the local-NACKed ARQ packet. In step 1420, the transmitter's ARQ entity delivers the ARQ packet to be retransmitted, to a lower layer. Upon receipt of a notification indicating completed transmission of the ARQ packet from the lower layer in step 1422, the transmitter's ARQ entity starts the timer Ti in step 1423.

In step 1422, the lower layer is a layer in charge of HARQ transmission, and if the lower layer receives an HARQ ACK for the HARQ packet including a particular ARQ packet, it sends a notification indicating completed transmission of the corresponding ARQ packet to the transmitter's ARQ entities 1105, 1110 and 1115.

If it is determined in step 1410 that the received NACK signal is an ARQ NACK, the transmitter's ARQ entity proceeds to step 1425 where it determines whether a timer T1 for the packet retransmission-requested by the ARQ NACK has expired. If the timer T1 has not expired, the transmitter's ARQ entity disregards the ARQ NACK in step 1440, because the ARQ packet retransmission-requested by the ARQ NACK has already been transmitted in the near past.

However, if the timer T1 has expired in step 1425, or if the timer T1 has not started before, the transmitter's ARQ entity proceeds to step 1430. The situation in which retransmission was requested by the ARQ NACK after expiration of the timer T1 is the situation in which even though the ARQ packet retransmission-requested by the ARQ NACK was retransmitted before, retransmission is requested again because the retransmission failed. When the timer T1 has not started before for a particular ARQ packet, the corresponding ARQ packet has not been previously retransmitted. According to an exemplary implementation, if retransmission is requested for the corresponding ARQ packet, the retransmission should be performed. According to an exemplary implementation, therefore, the transmitter's ARQ entity prepares for retransmission of the retransmission-requested ARQ packet in step 1430, and delivers the corresponding ARQ packet to the lower layer in step 1435.

As can be understood from the foregoing description, an exemplary embodiment of the present invention can simply detect an ARQ operation error in the mobile communication system supporting both HARQ and ARQ operations.

In addition, according to an exemplary embodiment of the present invention, the transmitter's HARQ entity can rapidly determine whether to retransmit an ARQ packet in such a manner that it delivers a local ACK/ANCK to a transmitter's ARQ entity, thereby contributing to noticeable improvement in performance of the ARQ operation.

Furthermore, an exemplary embodiment of the present invention can provide a low-complexity retransmission system that can rapidly determine whether to retransmit an ARQ packet depending on receipt of a local NACK.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A retransmission method performed in a transmitter of a mobile communication system supporting a Hybrid Automatic Retransmission reQuest (HARQ) operation and an Automatic Retransmission request (ARQ) operation for retransmission of a packet, the method comprising:
    transmitting, by an HARQ entity, an HARQ packet having at least one ARQ packet in the HARQ packet to a receiver; and
    if the HARQ packet fails in transmission, transmitting, by the HARQ entity, a local NACK signal indicating transmission fail of the ARQ packet to a corresponding ARQ entity,
    wherein the HARQ entity maintains an identifier of a corresponding ARQ entity where the ARQ packet is generated and a sequence number of the corresponding ARQ packet, as information of the ARQ packet, during transmission of the HARQ packet,
    and wherein the HARQ entity receives information to determine if the HARQ packet was properly transmitted.

2. The retransmission method of claim 1, wherein the HARQ entity writes, as information of the ARQ packet, an identifier of an HARQ processor that performs transmission/retransmission on the HARQ packet.

3. The retransmission method of claim 1, further comprising starting, by the HARQ entity, a timer for counting a reference time during transmission of the HARQ packet.

4. The retransmission method of claim 3, further comprising performing, by the HARQ entity, retransmission of the ARQ packet only in the case where it fails in transmission even though it performed the retransmission as many times as the number of retransmissions predefined in the HARQ entity when the reference time is set to zero.

5. The retransmission method of claim 3, further comprising determining by the HARQ entity whether an error indicator indicating occurrence of a NACK/ACK error is received from the receiver, for the reference time.

6. The retransmission method of claim 5, further comprising transmitting, by the HARQ entity, a local ACK signal indicating transmission success of the ARQ packet to the corresponding ARQ entity, if the error indicator is not received within the reference time.

7. The retransmission method of claim 6, further comprising discarding, by the transmitter, the corresponding ARQ packet stored in a transmission buffer, if there is transmission of the local ACK signal.

8. The retransmission method of claim 5, wherein the local NACK signal indicating transmission fail of the ARQ packet is transmitted when the error indicator is received within the reference time.

9. The retransmission method of claim 1, wherein the transmitting of a local NACK signal comprises:
    receiving a NACK signal for the HARQ packet from the receiver;
    determining whether the number of retransmissions on the HARQ packet has exceeded a reference retransmission limit; and
    transmitting the local NACK signal to the corresponding ARQ entity if the number of retransmissions has exceeded the reference retransmission limit.

10. The retransmission method of claim 1, wherein the HARQ entity receives an identifier of the ARQ entity and a sequence number of the corresponding ARQ packet from the corresponding ARQ entity.

11. The retransmission method of claim 5, further comprising:
    transmitting, by the HARQ entity, the local NACK signal and waiting the reference time, upon detecting transmission fail of the HARQ packet through the NACK signal transmitted from the receiver; and
    disregarding the received error indicator upon receipt of the error indicator indicating occurrence of the NACK/ACK error from the receiver during the wait.

12. The retransmission method of claim 5, wherein the error indicator comprises an HARQ processor identifier of the NACK/ACK-errored HARQ packet, and a timestamp indicating the time where the NACK/ACK-errored HARQ packet was last received at the receiver.

13. The retransmission method of claim 5, wherein the error indicator comprises an HARQ processor identifier of the NACK/ACK-errored HARQ packet and a timestamp indicating the time where the receiver receives a new HARQ packet that causes a soft-combining error.

14. The retransmission method of claim 13, wherein if the error indicator is received, the HARQ entity recognizes, as the NACK/ACK-errored HARQ packet, the HARQ packet having a timestamp which is less than but nearest to the timestamp from a transmission status table.

15. The retransmission method of claim 1, further comprising:
    starting, by the ARQ entity, a timer for counting a reference time and preparing for retransmission of the ARQ packet upon receipt of the local NACK signal; and
    disregarding, by the ARQ entity, an ARQ NACK signal received from an ARQ entity of the receiver for the reference time.

16. The retransmission method of claim 15, further comprising:
    determining by the ARQ entity whether the local NACK signal was received in a previous interval counted by the timer, if the ARQ NACK signal is received from the ARQ entity of the receiver; and
    disregarding the ARQ NACK signal if the local NACK signal was received in the previous interval, and preparing for retransmission of the corresponding ARQ packet if the local NACK signal was not received.

17. The retransmission method of claim 1, further comprising:
    preparing, by the ARQ entity, for retransmission of the ARQ packet upon receipt of the local NACK signal; and
    disregarding, by the ARQ entity, an ARQ NACK signal received from an ARQ entity of the receiver.

18. The retransmission method of claim 17, further comprising:
- determining by the ARQ entity whether the local NACK signal has been received before for a corresponding ARQ packet, if the ARQ NACK signal is received from the ARQ entity of the receiver; and
- disregarding, by the ARQ entity, the received ARQ NACK signal if the local NACK signal has been received before, and preparing for retransmission of the corresponding ARQ packet if the local NACK signal has not been received before.

19. The retransmission method of claim 1, further comprising:
- preparing, by the ARQ entity, for retransmission of the ARQ packet upon receipt of the local NACK signal;
- delivering, by the ARQ entity, the retransmitted ARQ packet to a lower layer; and
- starting, by the ARQ entity, a timer for counting a reference time upon receipt of a notification indicating completed retransmission of the ARQ packet from the lower layer.

20. The retransmission method of claim 19, further comprising:
- determining by the ARQ entity whether the timer is running, upon receipt of an ARQ NACK signal from an ARQ entity of the receiver; and
- preparing for retransmission of the corresponding ARQ packet if the timer has at least one of expired and stopped running, and disregarding the ARQ NACK signal if the timer is running.

21. A retransmission method performed in a receiver of a mobile communication system supporting a Hybrid Automatic Retransmission reQuest (HARQ) operation and an Automatic Retransmission request (ARQ) operation for retransmission of a packet, the method comprising:
- receiving, by an HARQ entity, an HARQ packet having at least one ARQ packet in the HARQ packet from a transmitter;
- determining whether there is a reception error of the HARQ packet;
- if the reception error of the HARQ packet is caused by a NACK/ACK error, transmitting an error indicator indicating occurrence of the NACK/ACK error to the transmitter,
- wherein the NACK/ACK error indicates an error in which an HARQ NACK signal is mistaken for an HARQ ACK signal.

22. The retransmission method of claim 21, wherein the error indicator comprises an identifier of an HARQ processor where the NACK/ACK error occurred, and a timestamp indicating the time where the NACK/ACK error occurred.

23. A retransmission method performed in a mobile communication system supporting a Hybrid Automatic Retransmission reQuest (HARQ) operation and an Automatic Retransmission request (ARQ) operation for retransmission of a packet, the method comprising:
- transmitting, by a transmitter's HARQ entity, an HARQ packet having at least one ARQ packet in the HARQ packet to a receiver;
- receiving, by a receiver's HARQ entity, the HARQ packet and determining whether there is a reception error in the HARQ packet;
- transmitting, by the receiver's HARQ entity, an error indicator to a transmitter if the reception error of the HARQ packet is caused by a NACK/ACK error; and
- transmitting, by the transmitter's HARQ entity, a local NACK signal indicating transmission fail of a corresponding ARQ packet to a transmitter's ARQ entity upon receipt of the error indicator,
- wherein the NACK/ACK error indicates an error in which an HARQ NACK signal is mistaken for an HARQ ACK signal.

24. The retransmission method of claim 23, wherein the transmitter's HARQ entity writes an identifier of the transmitter's ARQ entity where the corresponding ARQ packet is generated and a sequence number of the corresponding ARQ packet, as information of the ARQ packet, during transmission of the HARQ packet.

25. The retransmission method of claim 23, wherein the transmitter's HARQ entity writes, as information of the ARQ packet, an identifier of an HARQ processor that performs transmission/retransmission on the HARQ packet.

26. The retransmission method of claim 23, further comprising starting, by the transmitter's HARQ entity, a timer for counting a reference time during transmission of the HARQ packet.

27. The retransmission method of claim 26, further comprising determining by the transmitter's HARQ entity whether the error indicator is received, for the reference time.

28. The retransmission method of claim 27, further comprising transmitting, by the transmitter's HARQ entity, a local ACK signal indicating transmission success of the corresponding ARQ packet to the transmitter's ARQ entity, if the error indicator is not received within the reference time.

29. The retransmission method of claim 27, wherein the local NACK signal is transmitted when the error indicator is received within the reference time.

30. The retransmission method of claim 27, wherein the transmitting of a local NACK signal comprises:
- receiving, by the transmitter's HARQ entity, a NACK signal for the HARQ packet from the receiver;
- determining by the transmitter's HARQ entity whether the number of retransmissions on the HARQ packet has exceeded a reference retransmission limit; and
- transmitting the local NACK signal to the corresponding ARQ entity if the number of retransmissions has exceeded the reference retransmission limit.

31. A retransmission apparatus comprised in a transmitter of a mobile communication system supporting a Hybrid Automatic Retransmission reQuest (HARQ) operation and an Automatic Retransmission request (ARQ) operation for retransmission of a packet, the apparatus comprising:
- at least one ARQ entity for generating at least one ARQ packet; and
- an HARQ entity for transmitting an HARQ packet having the at least one ARQ packet in the HARQ packet to a receiver, and transmitting a local NACK signal indicating transmission fail of the ARQ packet to a corresponding ARQ entity, if the HARQ packet fails in transmission,
- wherein the HARQ entity writes an identifier of a corresponding ARQ entity where the ARQ packet is generated and a sequence number of the corresponding ARQ packet, as information of the ARQ packet, during transmission of the HARQ packet.

32. The retransmission apparatus of claim 31, wherein the HARQ entity writes, as information of the ARQ packet, an identifier of an HARQ processor that performs transmission/retransmission on the HARQ packet.

33. The retransmission apparatus of claim 31, wherein the HARQ entity starts a timer for counting a reference time during transmission of the HARQ packet.

34. The retransmission apparatus of claim 33, wherein the HARQ entity performs retransmission of the ARQ packet only in the case where it fails in transmission even though it performed the retransmission as many times as the number of retransmissions predefined in the HARQ entity when the reference time is set to zero.

35. The retransmission apparatus of claim 33, wherein the HARQ entity determines whether an error indicator indicating occurrence of a NACK/ACK error is received from the receiver, for the reference time.

36. The retransmission apparatus of claim 35, wherein the HARQ entity transmits a local ACK signal indicating transmission success of the ARQ packet to the corresponding ARQ entity, if the error indicator is not received within the reference time.

37. The retransmission apparatus of claim 36, wherein the transmitter discards the corresponding ARQ packet stored in a transmission buffer, if there is transmission of the local ACK signal.

38. The retransmission apparatus of claim 35, wherein the local NACK signal indicating transmission fail of the ARQ packet is transmitted when the error indicator is received within the reference time.

39. The retransmission apparatus of claim 31, wherein the HARQ entity receives a NACK signal for the HARQ packet from the receiver, determines whether the number of retransmissions on the HARQ packet has exceeded a reference retransmission limit, and transmits the local NACK signal to the corresponding ARQ entity if the number of retransmissions has exceeded the reference retransmission limit.

40. The retransmission apparatus of claim 32, wherein the HARQ entity receives an identifier of the ARQ entity and a sequence number of the corresponding ARQ packet from the corresponding ARQ entity.

41. The retransmission apparatus of claim 35, wherein the HARQ entity transmits the local NACK signal and waits the reference time, upon detecting transmission fail of the HARQ packet through the NACK signal transmitted from the receiver; and disregards the received error indicator upon receipt of the error indicator indicating occurrence of the NACK/ACK error from the receiver during the wait.

42. The retransmission apparatus of claim 35, wherein the error indicator comprises an HARQ processor identifier of the NACK/ACK-errored HARQ packet, and a timestamp indicating the time where the NACK/ACK-errored HARQ packet was last received at the receiver.

43. The retransmission apparatus of claim 35, wherein the error indicator comprises an HARQ processor identifier of the NACK/ACK-errored HARQ packet and a timestamp indicating the time where the receiver receives a new HARQ packet that causes a soft-combining error.

44. The retransmission apparatus of claim 43, wherein if the error indicator is received, the HARQ entity recognizes, as the NACK/ACK-errored HARQ packet, the HARQ packet having a timestamp which is less than but nearest to the timestamp from a transmission status table.

45. The retransmission apparatus of claim 31, wherein the ARQ entity starts a timer for counting a reference time and prepares for retransmission of the ARQ packet upon receipt of the local NACK signal, and disregards an ARQ NACK signal received from an ARQ entity of the receiver for the reference time.

46. The retransmission apparatus of claim 45, wherein the ARQ entity determines whether the local NACK signal was received in a previous interval counted by the timer, if the ARQ NACK signal is received from the ARQ entity of the receiver, disregards the ARQ NACK signal if the local NACK signal was received in the previous interval, and prepares for retransmission of the corresponding ARQ packet if the local NACK signal was not received.

47. The retransmission apparatus of claim 31, wherein the ARQ entity prepares for retransmission of the ARQ packet upon receipt of the local NACK signal, and disregards an ARQ NACK signal received from an ARQ entity of the receiver.

48. The retransmission apparatus of claim 47, wherein the ARQ entity determines whether the local NACK signal has been received before for a corresponding ARQ packet, if the ARQ NACK signal is received from the ARQ entity of the receiver, disregards the received ARQ NACK signal if the local NACK signal has been received before, and prepares for retransmission of the corresponding ARQ packet if the local NACK signal has not been received before.

49. The retransmission apparatus of claim 31, wherein the ARQ entity prepares for retransmission of the ARQ packet upon receipt of the local NACK signal, delivers the retransmitted ARQ packet to a lower layer, and starts a timer for counting a reference time upon receipt of a notification indicating completed retransmission of the ARQ packet from the lower layer.

50. The retransmission apparatus of claim 49, wherein the ARQ entity determines whether the timer is running, upon receipt of an ARQ NACK signal from an ARQ entity of the receiver, prepares for retransmission of the corresponding ARQ packet if the timer has at least one of expired and stopped running, and disregards the ARQ NACK signal if the timer is running.

51. A retransmission apparatus comprised in a receiver of a mobile communication system supporting a Hybrid Automatic Retransmission reQuest (HARQ) operation and an Automatic Retransmission request (ARQ) operation for retransmission of a packet, the apparatus comprising:
    an HARQ entity for receiving an HARQ packet having at least one ARQ packet in the HARQ packet from a transmitter, determining whether there is a reception error of the HARQ packet, and if the reception error of the HARQ packet is caused by a NACK/ACK error, transmits an error indicator indicating occurrence of the NACK/ACK error to the transmitter,
    wherein the NACK/ACK error indicates an error in which an HARQ NACK signal is mistaken for an HARQ ACK signal.

52. The retransmission apparatus of claim 51, wherein the error indicator comprises an identifier of an HARQ processor where the NACK/ACK error occurred, and a timestamp indicating the time where the NACK/ACK error occurred.

53. A retransmission system supporting a Hybrid Automatic Retransmission reQuest (HARQ) operation and an Automatic Retransmission request (ARQ) operation for retransmission of a packet, the system comprising:
    a transmitter comprising a transmitter's HARQ entity for transmitting an HARQ packet having at least one ARQ packet in the HARQ packet to a receiver, and if a NACK/ACK error of the HARQ packet occurs, receiving an error indicator transmitted from the receiver and then transmitting a local NACK signal indicating transmission fail of a corresponding ARQ packet to a transmitter's ARQ entity; and
    the receiver comprising a receiver's HARQ entity for receiving the HARQ packet from the transmitter, determining whether there is a reception error in the received HARQ packet, and transmitting the error indicator to the transmitter if the reception error of the HARQ packet is caused by a NACK/ACK error, wherein the NACK/ACK error indicates an error in which an HARQ NACK signal is mistaken for an HARQ ACK signal.

54. The retransmission apparatus of claim 53, wherein the transmitter's HARQ entity writes an identifier of the transmitter's ARQ entity where the corresponding ARQ packet is generated and a sequence number of the corresponding ARQ packet, as information of the ARQ packet, during transmission of the HARQ packet.

55. The retransmission apparatus of claim 53, wherein the transmitter's HARQ entity writes, as information of the ARQ packet, an identifier of an HARQ processor that performs transmission/retransmission on the HARQ packet.

56. The retransmission apparatus of claim 53, wherein the transmitter's HARQ entity starts a timer for counting a reference time during transmission of the HARQ packet.

57. The retransmission apparatus of claim 56, wherein the transmitter's HARQ entity determines whether the error indicator is received, for the reference time.

58. The retransmission apparatus of claim 57, wherein the transmitter's HARQ entity transmits a local ACK signal indicating transmission success of the corresponding ARQ packet to the transmitter's ARQ entity, if the error indicator is not received within the reference time.

59. The retransmission apparatus of claim 57, wherein the local NACK signal is transmitted when the error indicator is received within the reference time.

60. The retransmission apparatus of claim 57, wherein the transmitter's HARQ entity receives a NACK signal for the HARQ packet from the receiver, determines whether the number of retransmissions on the HARQ packet has exceeded a reference retransmission limit, and transmits the local NACK signal to the corresponding transmitter's ARQ entity if the number of retransmissions has exceeded the reference retransmission limit.

* * * * *